(12) United States Patent
Miyakosawa et al.

(10) Patent No.: US 7,934,709 B2
(45) Date of Patent: May 3, 2011

(54) VISCOUS FLUID-SEALED DAMPER

(75) Inventors: Rie Miyakosawa, Tokyo (JP); Junji Ohki, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 817 days.

(21) Appl. No.: 11/898,832

(22) Filed: Sep. 17, 2007

(65) Prior Publication Data

US 2009/0032675 A1 Feb. 5, 2009

(30) Foreign Application Priority Data

Aug. 2, 2007 (JP) .................................. 2007-201820

(51) Int. Cl.
*F16F 9/10* (2006.01)

(52) U.S. Cl. ...................... 267/140.13; 267/35; 267/118; 267/124; 248/631

(58) Field of Classification Search .................. 267/113, 267/118, 122, 124, 136, 140.11, 140.12, 267/140.13, 34, 35; 248/562, 631, 638
See application file for complete search history.

(56) References Cited

U.S. PATENT DOCUMENTS

| | | | | |
|---|---|---|---|---|
| 5,323,885 | A | * | 6/1994 | Fukunaga et al. ............. 188/381 |
| 5,379,990 | A | * | 1/1995 | Ando et al. ...................... 267/34 |
| 2002/0089101 | A1* | | 7/2002 | Itakura ...................... 267/140.11 |
| 2003/0112735 | A1* | | 6/2003 | Itakura .......................... 369/263 |

FOREIGN PATENT DOCUMENTS

| | | |
|---|---|---|
| EP | 0 583 946 A1 | 2/1994 |
| JP | 03-084243 A | 4/1991 |
| JP | 04-157225 A | 5/1992 |
| JP | 04-157691 A | 5/1992 |
| JP | 08-184345 A | 7/1996 |
| JP | 10205565 A * | 8/1998 |
| JP | 10-318330 A | 12/1998 |
| JP | 11-010660 A | 1/1999 |
| JP | 11-063083 A | 3/1999 |
| JP | 2000-065120 A | 3/2000 |
| JP | 2000-220681 | 8/2000 |
| JP | 2001-57068 | 2/2001 |
| JP | 2004-308892 A | 11/2004 |
| JP | 2005-265114 A | 9/2005 |

OTHER PUBLICATIONS

Communication from European Patent Office dated 11-21-07 for application no. 07017252.32424.

* cited by examiner

*Primary Examiner* — Thomas J Williams
(74) *Attorney, Agent, or Firm* — Cermak Nakajima LLP; Tomoko Nakajima

(57) ABSTRACT

Provided is a viscous fluid-sealed damper which helps to achieve an increase in degree of freedom in terms of the selection of the material of a sealing container, which can be produced with high production efficiency, and which helps to avoid leakage of the viscous fluid. A lid member is fixed to a container main body while compressing and holding a flange portion between a sealing member and the lid member, so an opening end of the container main body can be sealed with the lid member without having to effect fixation through fusion-bonding as in the prior art, and the degree of freedom in terms of material selection can be increased. Further, if the container main body is formed of a butyl rubber, the container main body can be fixed to the lid member without using any adhesive, so it is possible to achieve a reduction in production time and in cost. Further, it is possible to avoid leakage of the viscous fluid due to defective adhesion.

13 Claims, 20 Drawing Sheets

VISCOUS FLUID-SEALED DAMPER

BACKGROUND OF THE INVENTION

1. Field of the Invention

The present invention relates to a vibration damping technique for a disk device such as an optical disk device or an magneto-optical disk device for use in audio apparatuses, video apparatuses, information apparatuses, and various precision apparatuses for on-vehicle uses and consumer uses, and in particular, the present invention relates to a viscous fluid-sealed damper for damping vibration of a supported body such as a mechanical chassis formed by a motor, an optical pickup, a disk table, etc.

2. Description of the Related Art

A disk device is a precision device which brings an optical pickup or the like close to a disk being rotated at high speed by a motor to record or reproduce information on or from the disk. Thus, the disk device is vulnerable to external vibration transmitted from the outside of the apparatus and to internal vibration generated by rotation of an eccentric disk, and it is necessary to prevent a malfunction due to such vibration. In view of this, it is common practice to provide a viscous fluid-sealed damper between a mechanical chassis on which a disk table or the like is mounted and a casing being a supporting body to thereby damp vibration of the mechanical chassis.

As shown in FIG. 29, for example, in JP 2000-220681 A or JP 2001-57068 A, such a conventional viscous fluid-sealed damper 1 is mounted between a mechanical chassis 4 and a casing 7, with a flexible portion 3 of a sealing container 2 being fixed to a hard mounting shaft 5 provided on the mechanical chassis 4, and a lid portion 6 of the sealing container 2 being fixed to the casing 7 by a mounting screw N. On the other hand, one end of each suspension spring 8, the other end of which is mounted to the casing 7, is mounted to the mechanical chassis 4 which is thereby supported in a floating state within the casing 7. In a disk device 9, both the viscous fluid-sealed dampers 1 and the suspension springs 8 are used, whereby the mechanical chassis 4 is elastically supported in a floating state within the casing 7.

As shown in FIG. 30, a viscous fluid 10 such as silicone oil is sealed in the sealing container 2 of each viscous fluid-sealed damper 1. The sealing container 2 has a cylindrical peripheral wall portion 11 formed of hard thermoplastic resin, one end of which is sealed by the flexible portion 3 formed of a thermoplastic elastomer and the other end of which equipped with a flange is sealed by the lid portion 6 formed of the same thermoplastic resin as that forming the peripheral wall portion 11. The flexible portion 3 has a bottomed cylindrical agitation tube portion 12, which is equipped with an accommodation recess 13. The peripheral wall portion 11 and the flexible portion 3 are thermally fusion-bonded to each other through two-color molding, and the peripheral wall portion 11 and the lid portion 6 are fixed to each other through ultrasonic fusion-bonding.

When vibration is applied to the disk device 9, the agitation tube portion 12, which is integral with the mounting shaft 5 inserted into the accommodation recess 13, is caused to move vertically and horizontally (three-dimensionally) to agitate the viscous fluid 10 sealed in the sealing container 2 to thereby generate viscous resistance, whereby the vibration damping effect of the viscous fluid-sealed damper 1 is exerted.

In the viscous fluid-sealed damper 1, the sealing container 2 is formed of a thermoplastic material, so the flexible portion 3, the peripheral wall portion 11, and the lid portion 6 can be molded in a short time, and the fixing of the flexible portion 3 and the peripheral wall portion 11 to each other and the fixing of the peripheral wall portion 11 and the lid portion 6 to each other can be effected through thermally fusion-bonding at the time of molding and ultrasonic fusion-bonding, respectively, as stated above, thereby advantageously providing high productivity. However, a thermoplastic elastomer has a problem in that the degree of freedom in terms of material selection is rather low. For example, to effect firm fixation between the flexible portion 3, whose fixation area is small, and the peripheral wall portion 11, the thermoplastic elastomer and the thermoplastic resin that can be used as materials are limited. Further, regarding the thermoplastic elastomer of the flexible portion 3, it is rather difficult to select a material having vibration damping performance, vibration resistance, gas permeation resistance, temperature dependence, etc.

To overcome the above problem, a method is available according to which the flexible portion 3, the peripheral wall portion 11, and the lid portion 6 forming the sealing container 2 are formed of the same thermosetting elastomer. In this method, there is no need to fusion-bond the members to each other, and it is not necessary to take into consideration the combination of members allowing fusion-bonding, so it is possible to widen the material selection range. Thus, by selecting a thermosetting elastomer depending on the requisite performance, it is advantageously possible to realize a viscous fluid-sealed damper superior in vibration damping performance, vibration resistance, gas permeation resistance, temperature dependence, etc. However, since the members are fixed to each other by adhesive, long production time and high cost are required. Further, if, when filling the sealing container 2 with the viscous fluid 10, the viscous fluid 10 is allowed to adhere to the fixation surfaces of the members, defective adhesion occurs between the peripheral wall portion 11 and the lid portion 6, which leads to leakage of the viscous fluid 10.

SUMMARY OF THE INVENTION

The present invention has been made in view of the above problems in the prior art. It is an object of the present invention to provide a viscous fluid-sealed damper which helps to increase the degree of freedom in terms of the selection of the material of the sealing container, which can be produced with high production efficiency, and which can avoid leakage of the viscous fluid.

To achieve the above object, the present invention adopts the following construction. That is, the present invention provides a viscous fluid-sealed damper including: a sealing container including a container main body and a lid member closing an opening end of the container main body; and a viscous fluid sealed in the sealing container, the sealing container being fixed to a supporting body and to a supported body to damp vibration of the supported body by virtue of viscous resistance of the viscous fluid, in which the container main body includes, at an opening end, a flange portion which outwardly protrudes, and in which the viscous fluid-sealed damper further includes a sealing member including a lock surface portion to be locked to the flange portion and a fixation surface portion to be fixed to the lid member at an outer periphery of the container main body, the fixation surface portion and the lid member being fixed to each other to thereby hold the flange portion between the lock surface portion and the lid member in a compressed state, for sealing the opening end of the container main body in a liquid-tight fashion.

According to the present invention, the container main body is fixed to the lid member, with the flange portion provided at the opening end of the container main body being compressed and held between the sealing member and the lid member. Thus, it is possible to seal the opening end of the container main body with the lid member without having to perform fixation by fusion-bonding as in the prior-art technique, and there is no need to take into consideration the combination of the materials of the container main body and the lid member allowing fusion-bonding. Thus, it is possible to enhance the degree of freedom in terms of material selection, and to realize a sealed container providing the requisite performance for a viscous fluid-sealed damper.

Further, it is possible to seal the opening end of the container main body with the lid member without using any adhesive. For example, when the container main body is formed of a thermosetting elastomer, there is no need to fix the container main body and the lid member to each other by adhesive, thereby achieving a reduction in production time and cost. Further, in the prior-art technique, if, when sealing the opening end of the container main body with the lid member with adhesive, some viscous fluid is allowed to adhere to the adhesion surfaces, there is a fear of leakage of viscous fluid due to defective adhesion. In the present invention, however, no such problem is involved since the opening end of the container main body is closed through fixation of the sealing member and the lid member to each other.

In the viscous fluid-sealed damper of the present invention, the lid member is provided with a protruding wall portion protruding to the side of the inner peripheral surface of the opening end side portion of the container main body. Thus, it is possible to suppress inward deformation of the opening end side portion of the container main body by virtue of the protruding wall portion. Thus, it is possible to make the opening end side portion of the container main body relatively free from inward deformation, making it possible to reliably compress and hold the flange portion provided at the opening end. For example, when the protruding dimension of the protruding wall portion is made larger than the thickness dimension of the sealing member, and the outer peripheral surface of the opening end side portion of the container main body is fixed to a mounting hole formed in the supporting body or the supported body, the opening end side portion of the container main body is held between the protruding wall portion and the mounting hole, thereby preventing detachment of the container main body from the mounting hole due to deformation thereof.

In the viscous fluid-sealed damper of the present invention having the protruding wall portion, the protruding wall portion is provided so as to be in contact with the inner peripheral surface of the opening end side portion of the container main body. That is, the outer peripheral surface of the opening end portion of the container main body is pressed by the sealing member compressing and holding the flange portion of the container main body, and the inner peripheral surface of the opening end portion of the container main body is pressed by the protruding wall portion. Thus, it is possible to reliably fix the opening end of the container main body to the lid member, making it possible to hold the opening end and the flange portion in intimate contact with the lid member if the container main body is deformed. Thus, it is possible to enhance the liquid-tightness of the sealing container, and to make it relatively free from leakage of viscous fluid. The protruding wall portion being in contact with the inner peripheral surface of the container main body may or may not compress the opening end side portion of the container main body between the protruding wall portion and the sealing member. However, in the case in which the protruding wall portion compresses the opening end side portion of the container main body between the protruding wall portion and the sealing member, it is possible to further enhance the liquid-tightness of the sealing container.

In the viscous fluid-sealed damper of the present invention having the protruding wall portion, the protruding wall portion is formed in an annular configuration, and a deairing gap portion is provided in the protruding wall portion. When producing the viscous fluid-sealed damper, the viscous fluid is poured into the container main body with the opening end on the upper side, and the lid member is placed on the opening end for sealing. If, when placing the lid member having the protruding wall portion on the opening end, the air in the space surrounded by the annular protruding wall portion is also allowed to be sealed in, there is a fear of a deterioration in the vibration damping effect. In the present invention, however, the deairing gap portion is provided in the protruding wall portion, so it is possible to place the lid member on the opening end while allowing the air in the space surrounded by the annular protruding wall portion to escape through the gap portion. Thus, when placing the lid member having the protruding wall portion on the opening end for sealing, air is hardly sealed in.

In the viscous fluid-sealed damper of the present invention having the protruding wall portion, the inner surface of the lid member is formed as an inclined surface whose central portion protrudes toward the interior of the container main body. Thus, it is possible to diminish the space surrounded by the annular protruding wall portion, making it possible to reduce the amount of air in the space surrounded by the protruding wall portion. Further, when placing the lid member on the opening end, closing is gradually effected starting from the central portion of the inner surface of the lid member toward the outer periphery thereof, so it is possible to place the lid member while allowing the air in the space surrounded by the annular protruding wall portion to escape. Thus, when placing the lid member having the protruding wall portion on the opening end for sealing, air is hardly allowed to be sealed in. Further, in the case of the viscous fluid-sealed damper of the present invention whose protruding wall portion is equipped with a deairing gap portion, the inner surface of the lid member can be formed as an inclined surface directed to the gap portion. In this construction, when placing the cover member on the opening end, it is possible to guide air to the gap portion along the inclined surface, so air is hardly allowed to be sealed in.

In the viscous fluid-sealed damper of the present invention, the sealing member is provided with an outer wall portion protruding to the side of the outer peripheral surface of the opening end side portion of the container main body. Thus, if the container main body swings in a direction crossing the axis thereof upon receiving vibration or impact, and the opening end side portion of the container main body threatens to be outwardly deformed, it is possible to prevent deformation of the opening end side portion of the container main body by virtue of the outer wall portion of the sealing member.

In the viscous fluid-sealed damper of the present invention, at least one of the lock surface portion of the sealing member and the lid member holding the flange portion therebetween is provided with a pressing protrusion further compressing the flange portion. By thus providing the sealing member or the lid member with a pressing protrusion pressing the flange portion, it is possible to strongly compress a part of the flange portion, thereby enhancing the sealing pressure of the flange portion and the lid member. Thus, the liquid-tightness of the sealing container is enhanced, making it relatively free from leakage of viscous fluid.

In the viscous fluid-sealed damper of the present invention, at least one of the lock surface portion of the sealing member and the lid member holding the flange portion therebetween is provided with a protrusion or an engagement groove, and the flange portion is provided with at least one of an engagement groove and a protrusion to be fit-engaged therewith. Thus, through engagement of the protrusion and the engagement groove, it is possible to accurately effect positioning on the flange portion with respect to the sealing member and the lid member. Further, by causing the engagement surface between the lock surface portion of the sealing member and the lid member with respect to the flange portion to meander through fit-engagement, the engagement area is increased, so liquid leakage hardly occurs. Further, in this case, by making the depth of the engagement groove smaller than the height of the protrusion, it is possible to strongly compress the flange portion with the protrusion, thereby achieving a further enhancement in liquid-tightness.

In the viscous fluid-sealed damper of the present invention, the flange portion is provided with a through-hole extending through the thickness thereof, and at least one of the sealing member and the lid member is provided with a fixation protrusion to be inserted into the through-hole to fix the sealing member and the lid member to each other. Thus, by inserting the fixation protrusion into the through-hole, it is possible to accurately effect positioning on the flange portion with respect to the sealing member and the lid member. In particular, when a fixation protrusion is provided on each of the sealing member and the lid member, and those fixation protrusions are fixed to each other within the through-hole of the flange portion, it is possible to firmly assemble together the container main body, the sealing member, and the lid member through physical fit-engagement.

In the viscous fluid-sealed damper of the present invention, the sealing member and the lid member are formed of a hard resin material allowing ultrasonic fusion-bonding, and the lid member is provided with a fixation surface portion to be fixed to a fixation surface portion of the sealing member through ultrasonic fusion-bonding. That is, by fixing the fixation surface portion of the sealing member and the fixation surface portion of the lid member to each other through ultrasonic fusion-bonding, it is possible to firmly fix the sealing member and the lid member to each other. Further, ultrasonic fusion-bonding allows fixation processing to be conducted in a short time, so it is possible to achieve an improvement in terms of production efficiency.

In the viscous fluid-sealed damper of the present invention, the container main body is equipped with a mounting portion fixed to one of a supporting body and a supported body, a flexible portion formed of a rubber-like elastic material and supporting the mounting portion in a floating manner, and a peripheral wall portion fixed to a through-hole formed in the other of the supporting body and the supported body. The peripheral wall portion has a wall thickness larger than that of the flexible portion, and an annular slope expanding outwardly from the flexible portion side toward the opening side is provided on the outer peripheral surface of the peripheral wall portion. Thus, when the container main body is inserted into the annular sealing member from the mounting portion side, the insertion of the container main body is facilitated due to the slope provided on the outer peripheral surface of the peripheral wall portion. Further, when incorporating the viscous fluid-sealed damper into a disk apparatus, by inserting the sealing container into the through-hole formed in the supporting body or the supported body starting with the container main body mounting portion side, the insertion of the sealing container is facilitated due to the slope formed on the outer peripheral surface of the peripheral wall portion, thus enabling the viscous fluid-sealed damper to be easily incorporated.

Further, since the peripheral wall portion has a wall thickness larger than that of the flexible portion, the peripheral wall portion is harder to deform than the flexible portion, so it can be reliably fixed into the through-hole formed in the supporting body or the supported body. Further, by providing the outer peripheral surface of the peripheral wall portion with an annular mounting groove portion to be engaged with the hole edge of the through-hole formed in the supporting body or the supported body, it is possible to effect positioning and fixation reliably.

In the viscous fluid-sealed damper of the present invention, it is possible to seal the opening end of the container main body with the lid member without having to effect fixation by fusion-bonding as in the prior-art technique, and there is no need to examine the combination of the materials of the container main body and the lid member as to whether it allows fusion-bonding or not. Thus, it is possible to achieve a larger degree of freedom in terms of the selection of the materials, making it possible to realize a sealing container in conformity with the performance required of the viscous fluid-sealed damper.

Further, since it is possible to seal the opening end of the container main body without having to use any adhesive, it is possible to shorten the production time and reduce the production cost. Further, it is possible to avoid leakage of viscous fluid due to defective adhesion.

The above description of this invention should not be construed restrictively; the advantages, features, and uses of this invention will become more apparent from the following description given with reference to the accompanying drawings. Further, it should be understood that all appropriate modifications made without departing from the gist of this invention are to be covered by the scope of this invention.

DESCRIPTION OF THE PREFERRED EMBODIMENTS

In the following, embodiments of the present invention will be described with reference to the drawings. In the following description, the components that are common to the embodiments are indicated by the same reference symbols, and a redundant description of such components will be omitted.

First Embodiment

Figure 1:
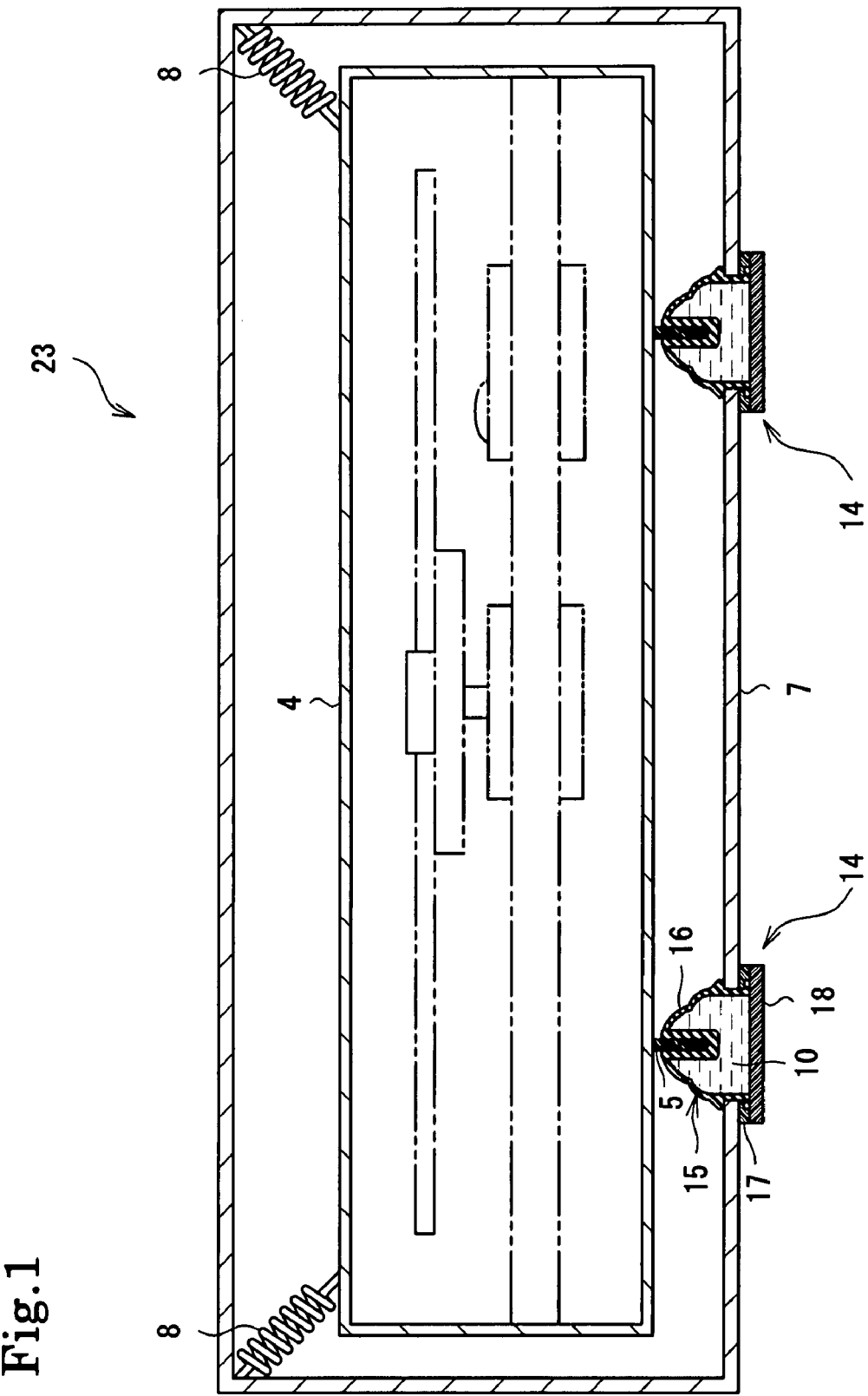
FIG. 1 is an explanatory view of a disk device to which a viscous fluid-sealed damper according to a first embodiment of the present invention is mounted.
Figure 2:
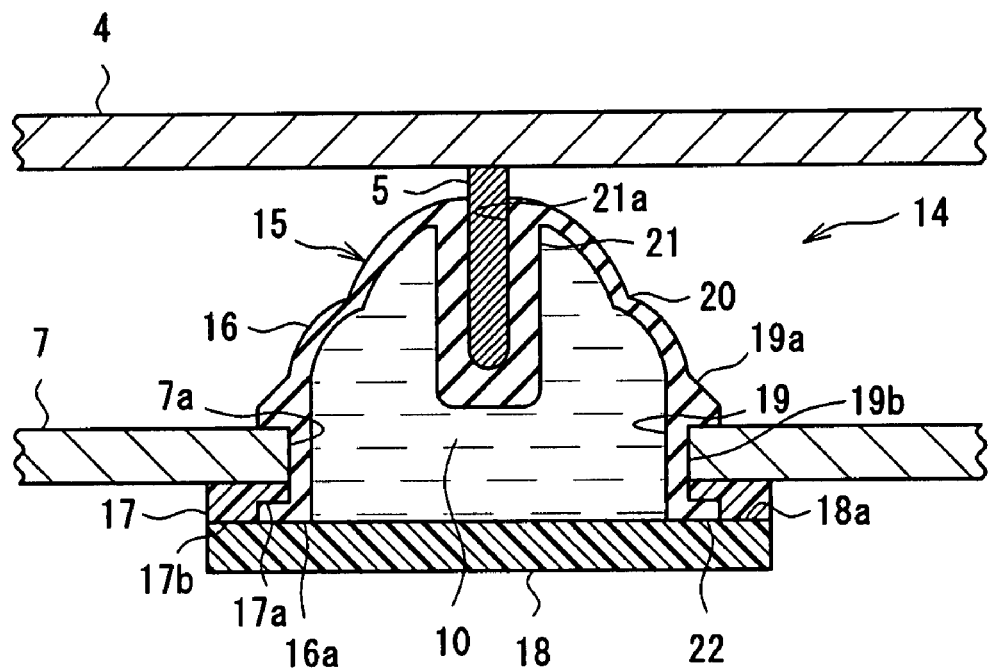
FIG. 2 is a sectional view of the viscous fluid-sealed damper of FIG. 1.
Figure 3:
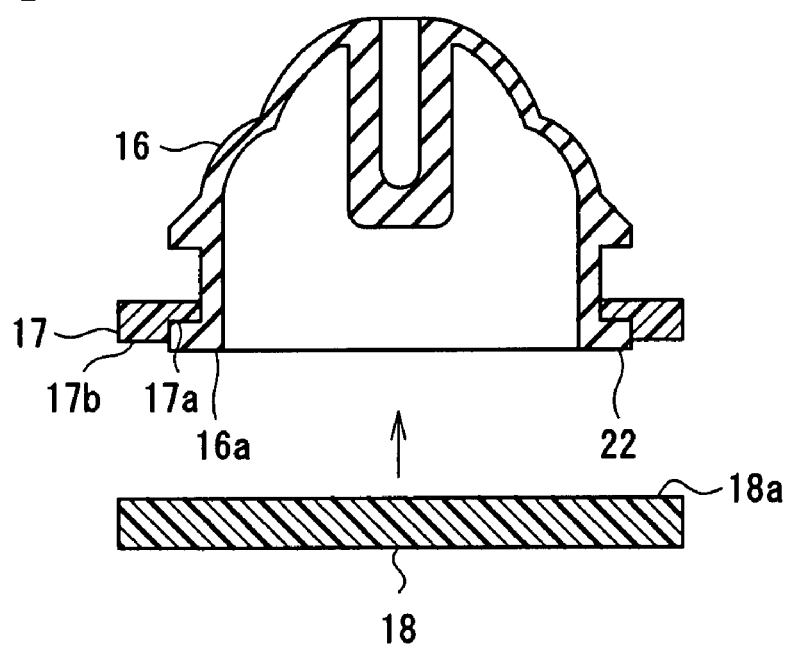
FIG. 3 is a sectional view of a sealing container of the viscous fluid-sealed damper shown in FIG. 1.

FIGS. 1 Through 3

FIGS. 1 through 3 show a viscous fluid-sealed damper 14 according to a first embodiment. In a viscous fluid-sealed damper 14 according to a first embodiment, a viscous fluid 10 is sealed in a sealing container 15. The sealing container 15 is composed of a container main body 16, a sealing member 17, and a lid member 18.

The container main body 16 is formed of a rubber-like elastic material, more specifically, a butyl rubber, and is formed in a hollow-bowl-like configuration with one end open. There are formed, starting from an opening end 16a side, a peripheral wall portion 19, a flexible portion 20, and a central mounting portion 21 in this order. Of those, the peripheral wall portion 19 has at is lower end an outwardly protruding flange portion 22 provided over the entire periphery, and further has at its upper end a protrusion 19a having an annular slope spreading outwards from the upper end side toward the lower end side. Between the flange portion 22 and the protrusion 19a, there is formed over the entire periphery an annular mounting groove portion 19b engaged with a through-hole 7a of a casing 7. And the flexible portion 20, whose wall thickness is smaller than that of the peripheral wall portion 19, is formed so as to close the upper end side of the peripheral wall portion 19. The flexible portion 20 is formed in a bellows-like dome-shaped sectional configuration, and has the central mounting portion 21 at its center. The central mounting portion 21 is formed as a bottomed cylinder, and protrudes into the interior of the container main body 16. A mounting shaft 5 protruding from a mechanical chassis 4 is inserted into an accommodation recess 21a of the central mounting portion 21. The central mounting portion 21 moves integrally with the mounting shaft 5 inserted into the accommodation recess 21a to function also as an agitating portion for agitating the viscous fluid 10. Any vibration is damped by viscous resistance generated through agitation of the viscous fluid 10.

The sealing member 17 is formed in an annular configuration of a thermoplastic hard resin, more specifically, a polypropylene resin, and is a component separate from the above-described container main body 16. Formed at the inner edge at the lower end of the sealing member 17 is a recessed lock surface portion 17a to be engaged with the flange portion 22. The lower end surface of the sealing member 17 except for the lock surface portion 17a constitutes a fixation surface portion 17b to be fixed to the lid member 18. As shown in FIG. 3, the depth of the lock surface portion 17a as measured in the thickness direction of the sealing member 17 is somewhat smaller than the thickness of the flange portion 22 before the sealing of the container main body 16 with the lid member 18. Thus, when the container main body 16 is sealed with the lid member 18, the flange portion 22 is held between the sealing member 17 and the lid member 18 in a compressed state.

The lid member 18 is formed in a disc-like configuration of a thermoplastic hard resin, more specifically, a polypropylene resin. The portion of the lid member 18 opposing the fixation surface portion 17b of the sealing member 17 constitutes a fixation surface portion 18a. The fixation surface portions 17b and 18a of the two members are fixed to each other by ultrasonic fusion-bonding, thereby closing the opening end 16a of the container main body 16.

Next, a disk device 23 equipped with the viscous fluid-sealed damper 14 of this embodiment will be described. As shown in FIGS. 1 and 2, the disk device 23 is equipped with a mechanical chassis 4, a casing 7 containing the mechanical chassis 4, the viscous fluid-sealed dampers 14, and suspension springs 8. Between the mechanical chassis 4 and the casing 7, there are mounted the viscous fluid-sealed dampers 14 and the suspension springs 8.

Each viscous fluid-sealed damper 14 is fixed in position through engagement of the mounting groove portion 19b of the peripheral wall portion 19 of the sealing container 15 with the hole edge of the through-hole 7a provided in the casing 7. On the other hand, the mounting shaft 5 protruding from the mechanical chassis 4 is inserted into the accommodation recess 21a of the central mounting portion 21 of the sealing container 15 and is fixed therein.

Here, the materials of the members forming the viscous fluid-sealed damper 14 of this embodiment will be described. The following description also applies to the other embodiments described below.

The "rubber-like elastic material" of the container main body 16 is made of a material having damping effect, and a natural rubber and a thermoplastic elastomer are preferred in addition to a synthetic rubber such as a butyl rubber employed in this embodiment. Examples of the synthetic rubber includes, in addition to the butyl rubber, a styrenebutadiene rubber, a chloroprene rubber, a nitrile rubber, a urethane rubber, a silicone rubber, a fluororubber, and an acrylic rubber. Examples of the thermoplastic elastomer include a styrene-based thermoplastic elastomer, an olefin-based thermoplastic elastomer, a urethane-based thermoplastic elastomer, and a vinyl chloride-based thermoplastic elastomer.

For the "hard resin" of the sealing member 17 and the lid member 18, a thermosetting resin can be used depending on performance requirements such as mechanical strength, heat resistance, durability, dimensional accuracy, and reliability as well as reduction of weight and processability, in addition to a thermoplastic resin such as a polypropyrene resin employed in this embodiment. Examples of the thermoplastic resin include, in addition to the polypropylene resin employed for the sealing member 17 and the lid member 18 in this embodiment, a polyethylene resin, a polyvinyl chloride resin, a polystyrene resin, an acrylonitrile styrene acrylate resin, an acrylonitrile butadiene styrene resin, a polyamide resin, a polyacetal resin, a polycarbonate resin, a polyethylene terephthalate resin, a polybutylene terephthalate resin, a polyphenylene oxide resin, a polyphenylene ether resin, a polyphenylene sulfide resin, a polyurethane resin, and a liquid crystal polymer. Alternatively, complex resins thereof can also be used. As a thermosetting resin, an epoxy resin, a urethane resin, or the like can be used. A hard resin having shock-absorbing property can improve cushioning action of the members.

The material of the viscous fluid 10 preferably contains liquid or liquid added with solid particles which do not react or dissolve therewith. For example, liquids such as a silicone-based oil, a paraffin-based oil, an ester-based oil, and a liquid rubber, or each of those liquids added with solid particles which do not react or dissolve therewith can be used. Of those, as a liquid, a silicone-based oil is preferred with a view to performance requirements such as temperature dependence, heat resistance, and reliability. Specifically, a dimethyl silicone oil, a methylphenyl silicone oil, a methylhydrogen silicone oil, and a fluorine-modified silicone oil can be used. As the solid particles which do not react or dissolve with those silicone-based oils, silicone resin particles, polymethylsilsesquioxane particles, a wet type silica, a dry type silica, a glass bead, a glass balloon, and the like, and surface-treated products thereof can be used. Those may be used alone or two or more thereof may be used in combination.

A method of manufacturing the viscous fluid-sealed damper 14 constructed as described above will be described. First, a butyl rubber is molded into the container main body 16. Then, the container main body 16 is inserted into the hole of the sealing member 17, which is obtained by separately injection-molding a polypropylene resin, such that the lock surface portion 17a of the sealing member 17 and the flange portion 22 of the container main body 16 are engaged with each other. Next, the viscous fluid 10 is poured into the container main body 16. Finally, the lid member 18 is put on the opening end 16a of the container main body 16, and the fixation surface portion 17b of the sealing member 17 and the fixation surface portion 18a of the lid member 18 are fixed to each other by ultrasonic fusion-bonding while compressing and holding the flange portion 22 therebetween, whereby the viscous fluid-sealed damper 14 is obtained.

Lastly, the effects of the viscous fluid-sealed damper 14 will be described.

In the viscous fluid-sealed damper 14, the lid member 18 is fixed to the container main body 16 while compressing and holding the flange portion 22 between the sealing member 17 and the lid member 18, so it is possible to seal the opening end 16a of the container main body 16 with the lid member 18 without having to fix the container main body 16 and the sealing member 17 to each other by fusion-bonding as in the prior-art technique. Further, it is possible to achieve an increase in the degree of freedom in terms of material selection, forming the container main body 16, for example, of a butyl rubber and forming the sealing member 17 and the lid member 18, for example, of a polypropylene resin. Thus, it is possible to realize the container main body 16 providing performances as required of the viscous fluid-sealed damper 14, such as high damping property and durability of the sealing container 15, and gas permeation resistance preventing intrusion of air into the sealed container 15.

Further, even if molded of a butyl rubber, the container main body 16 can be fixed to the lid member 18 without using any adhesive, so it is possible to achieve a reduction in production time and cost. Further, since the opening end 16a of the container main body 16 is closed through fixation of the sealing member 17 and the lid member 18 to each other, it is possible to avoid leakage of the viscous fluid 10 due to defective adhesion as in the prior art.

Provided on the peripheral wall portion 19 is the protrusion 19a having an annular slope spread from the upper end side toward the lower end side, so when inserting the container main body 16 into the annular sealing member 17 starting with the central mounting portion 21 side, the insertion of the container main body 16 is facilitated. Further, when incorporating the viscous fluid-sealed damper 14 into the disk device 23, the sealing container 15 can be easily inserted into the through-hole 7a of the casing 7 starting with the central mounting portion 21 side of the container main body 16, thus facilitating the mounting of the viscous fluid-sealed damper 14.

Further, the wall thickness of the peripheral wall portion 19 is larger than that of the flexible portion 20, and the annular groove portion 19b to be engaged with the hole edge of the through-hole 7a of the casing 7 is provided in the outer peripheral surface of the peripheral wall portion 19, so it is possible to perform positioning reliably on the viscous fluid-sealed damper 14 with respect to the casing 7 and to fix it thereto.

The fixation surface portion 17b of the sealing member 17 and the fixation surface portion 18a of the lid member 18 are fixed to each other by ultrasonic fusion-bonding. Thus, it is possible to enhance the fixation strength for the two surface portions. Further, ultrasonic fusion-bonding allows the fixation processing to be conducted in a short time, so it is possible to achieve an improvement in terms of production efficiency.

Second Embodiment

Figure 4:
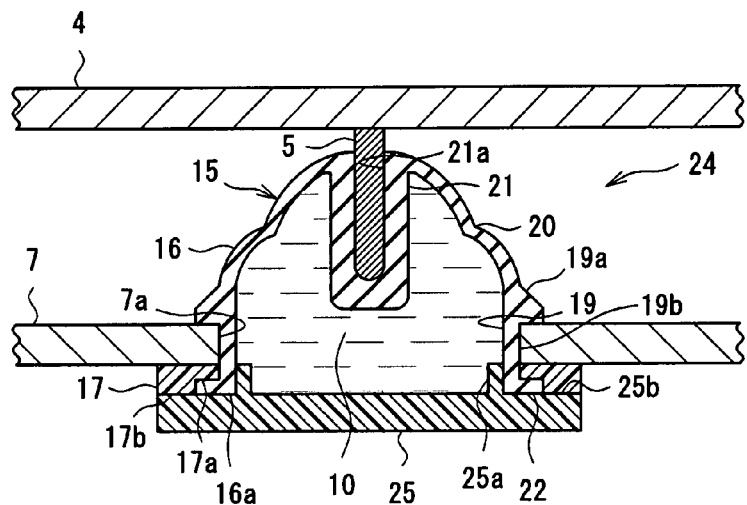
FIG. 4 is a sectional view corresponding to FIG. 2 of a viscous fluid-sealed damper according to a second embodiment of the present invention.
Figure 5A:
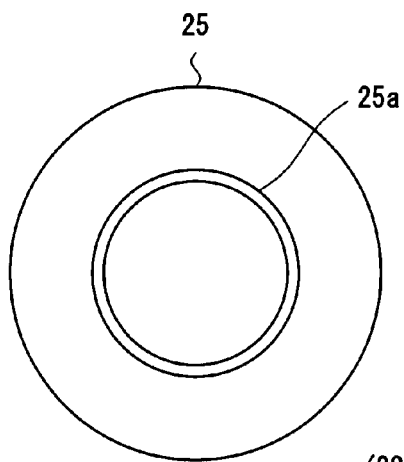
FIG. 5A is a plan view of a lid member used for the viscous fluid-sealed damper shown in FIG. 4.
Figure 5B:
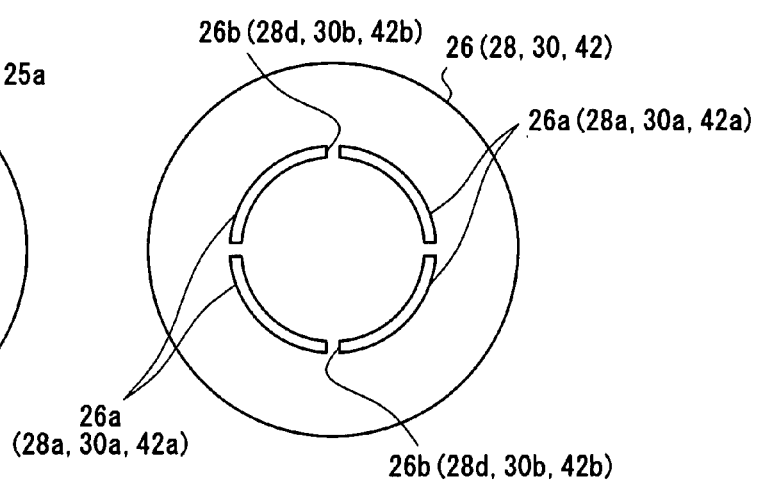
FIG. 5B is a plan view of a modification example of the lid member of FIG. 5A.

FIGS. 4, 5A, and 5B

FIGS. 4 and 5 show a viscous fluid-sealed damper 24 according to a second embodiment. A viscous fluid-sealed damper 24 according to a second embodiment of the present invention differs from the viscous fluid-sealed damper 14 of the first embodiment in the structure of a lid member 25. Otherwise, this embodiment is of the same construction and effects as the first embodiment.

Formed on the lid member 25 is a protruding wall portion 25a of an endless annular configuration protruding into the container main body 16 and held in contact with the inner peripheral surface of the peripheral wall portion 19 of the container main body 16 (FIG. 5A). The height dimension of the protruding wall portion 25a is equal to the thickness dimension of the sealing member 17. That is, the outer peripheral surface of the opening end 16a of the container main body 16 is pressed by the sealing member 17 compressing and holding the flange portion 22 of the peripheral wall portion 19, and the inner peripheral surface thereof is pressed by the protruding wall portion 25a. And the portion of the lid member 25 opposed to the fixation surface portion 17b of the sealing member 17 constitutes a fixation surface portion 25b.

Due to the same construction as that of the viscous fluid-sealed damper 14 of the first embodiment, the viscous fluid-sealed damper 24 of the second embodiment provides the same effects as those of the first embodiment. Further, the construction peculiar to this embodiment provides the following effects.

In the viscous fluid-sealed damper 24, it is possible to suppress inward deformation of the opening end 16a of the container main body 16 by virtue of the protruding wall portion 25a. Thus, the opening end 16a side portion of the container main body 16 is hardly deformed, and the flange portion 22 can be reliably compressed and held so that the flange portion 22 may not be allowed to move in the detaching direction.

Further, the outer peripheral surface of the opening end 16a side portion of the container main body 16 is pressed by the sealing member 17 compressing and holding the flange portion 22 of the container main body 16, and the inner peripheral surface thereof is pressed by the protruding wall portion 25a, so it is possible to fix the opening end 16a of the container main body 16 reliably to the lid member 25, making it possible to hold the opening end 16a and the flange position 22 in intimate contact with the lid member 25 even if the container main body 16 is deformed. Thus, the liquid-tightness of the sealing container 15 is enhanced, and the viscous fluid 10 is hardly allowed to leak.

Modification Example of Second Embodiment

While in the viscous fluid-sealed damper 24 according to the second embodiment the protruding wall portion 25a of the lid member 25 is formed in an endless annular configuration, a lid member 26 according to a modification example of the second embodiment includes, as shown in FIG. 5B, four annularly arranged divisional protruding wall portions 26a, allowing provision of deairing gap portions 26b. In this construction, it is possible to put the lid member 26 on the opening end 16a while allowing the air in the space surrounded by the annularly arranged protruding wall portions 26a to escape through the gap portions 26b between the adjacent protruding wall portions 26a. Thus, even though the lid member 26 has the annular protruding portions 26a protruding into the container main body 16, air is hardly allowed to be sealed in when effecting sealing by putting the lid member 26 on the opening end 16a.

Third Embodiment

FIG. 6

Figure 6:
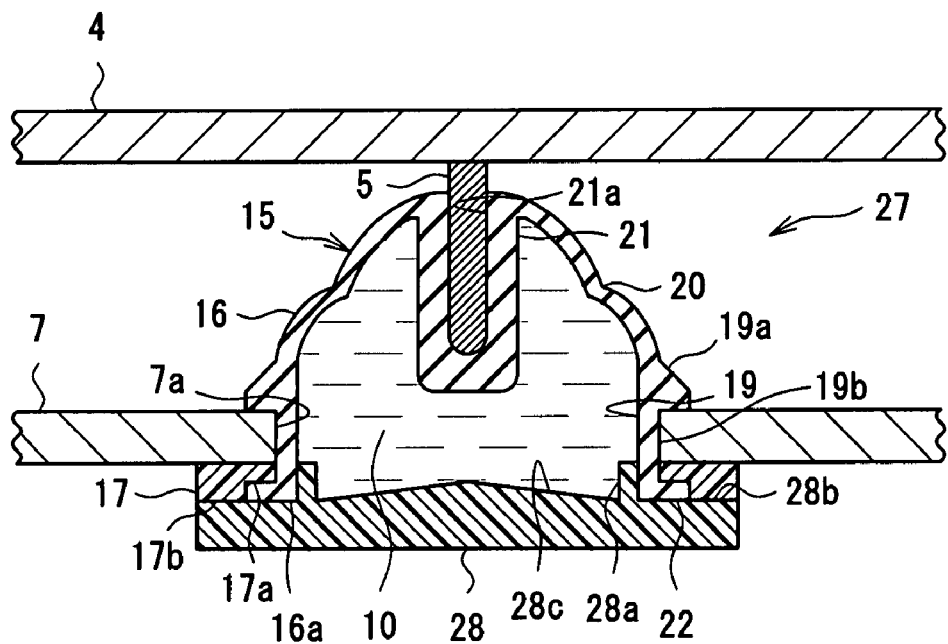
FIG. 6 is a sectional view corresponding to FIG. 2 of a viscous fluid-sealed damper according to a third embodiment of the present invention.

FIG. 6 shows a viscous fluid-sealed damper 27 according to a third embodiment. A viscous fluid-sealed damper 27 according to a third embodiment of the present invention differs from the viscous fluid-sealed damper 24 of the second embodiment in the structure of a lid member 28. Otherwise, the construction and effects of this embodiment is the same as those of the second embodiment and the first embodiment.

Like the lid member 25 of the second embodiment, the lid member 28 has an annular endless protruding wall portion 28a protruding into the container main body 16 and held in contact with the inner peripheral surface of the peripheral wall portion 19 of the container main body 16. The portion of the lid member 28 opposed to the fixation surface portion 17b of the sealing member 17 constitutes a fixation surface portion 28b. However, an inner surface 28c of the lid member 28 is formed as an inclined surface whose central portion protrudes into the container main body 16.

Due to the same construction as the viscous fluid-sealed damper 24 of the second embodiment, the viscous fluid-sealed damper 27 of the third embodiment provides the same effects as those of the second embodiment. Further, the construction peculiar to this embodiment provides the following effect.

In the viscous fluid-sealed damper 27, since the inner surface 28c of the lid member 28 is formed as an inclined surface whose central portion protrudes into the container main body 16, when putting the lid member 28 on the opening end 16a, closing is effected gradually from the center of the inner surface 28c of the lid member 28 toward the outer edge, making it possible to put the lid member 28 on the opening end 16a while allowing the air in the space surrounded by the annular endless protruding wall portion 28a to escape. Thus, when effecting sealing by putting the lid member 28 having the protruding wall portion 28a on the opening end 16a, air is hardly allowed to be sealed in. By forming gap portions 28d in the lid member 28 as in the modification example of the second embodiment (see FIG. 5B), air can be allowed to escape more easily.

Fourth Embodiment

FIG. 7

Figure 7:
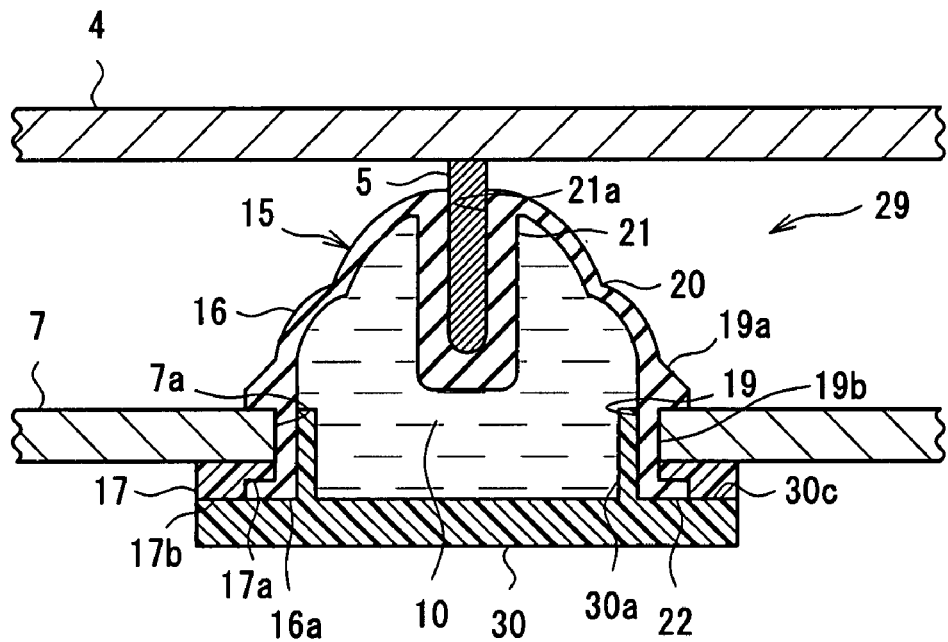
FIG. 7 is a sectional view corresponding to FIG. 2 of a viscous fluid-sealed damper according to a fourth embodiment of the present invention.

FIG. 7 shows a viscous fluid-sealed damper 29 according to a fourth embodiment. A viscous fluid-sealed damper 29 according to a fourth embodiment of the present invention differs from the viscous fluid-sealed damper 24 of the second embodiment in the structure of a lid member 30. Otherwise, this embodiment is of the same construction and effects as the second embodiment and the first embodiment.

Like the lid member 26 of the modification example of the second embodiment, the lid member 30 has protruding wall portions 30a protruding into the container main body 16 and consisting of four divisional members with ends arranged annularly and held in contact with the inner peripheral surface of the peripheral wall portion 19, with deairing gap portions 30b being provided (see FIG. 5B). The height dimension of the protruding wall portions 30a is larger than the thickness dimension of the sealing member 17. The portion of the lid member 30 opposed to the fixation surface portion 17b of the sealing member 17 constitutes a fixation surface portion 30c.

Due to the same construction as that of the viscous fluid-sealed damper 24 of the second embodiment, the viscous fluid-sealed damper 29 of the fourth embodiment provides the same effects as those of thee second embodiment. Further, the construction peculiar to this embodiment provides the following effects.

In the viscous fluid-sealed damper 29, it is possible to put the lid member 30 on the opening end 16a while allowing the air in the space surrounded by the annularly arranged protruding wall portions 30a to escape through the gap portions 30b between the adjacent protruding wall portions 30a. Thus, even though the lid member 30 has the annular protruding wall portions 30a protruding into the container main body 16, air is hardly allowed to be sealed in when effecting sealing by putting the lid member 30 on the opening end 16a.

Further, since the height dimension of the protruding wall portions 30a is larger than the thickness dimension of the sealing member 17, when the annular mounting groove portion 19b provided in the outer peripheral surface of the peripheral wall portion 19 of the container main body 16 is fixed into the through-hole 7a of the casing 7, the peripheral wall portion 19 of the container main body 16 is held between the protruding wall portions 30a and the through-hole 7a. Thus, it is possible to prevent, upon receiving vibration, the mounting groove portion 19b of the container main body 16 from being deformed so as to open to be detached from the through-hole 7a.

Fifth Embodiment

Figure 8:
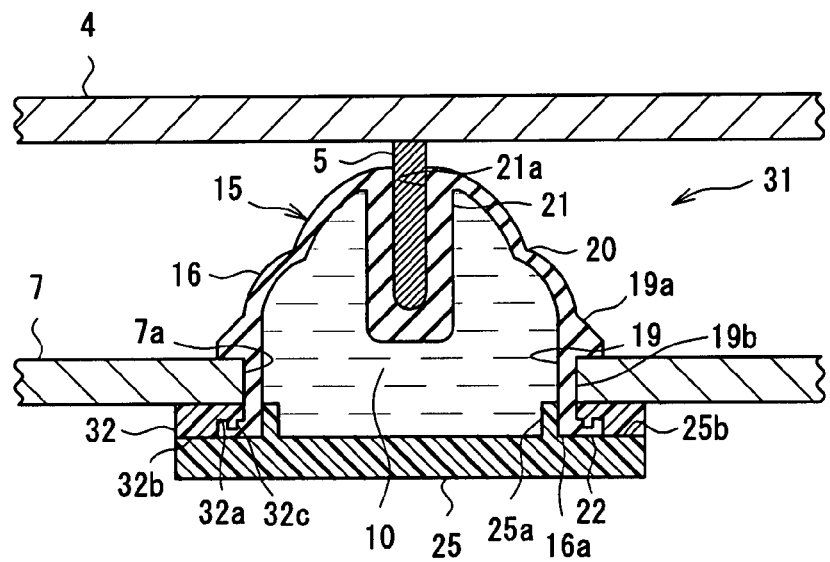
FIG. 8 is a sectional view corresponding to FIG. 2 of a viscous fluid-sealed damper according to a fifth embodiment of the present invention.
Figure 9A:
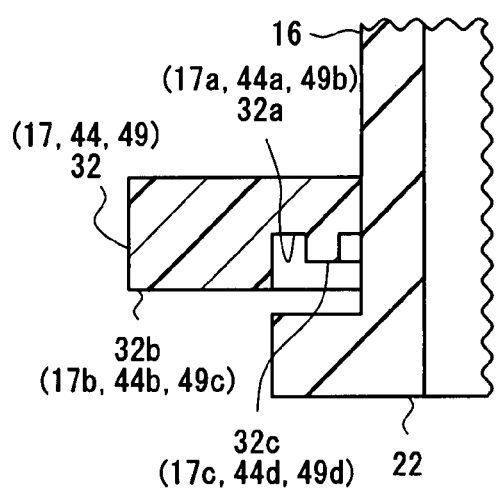
FIG. 9A is an enlarged explanatory view of a sealing member and a container main body of the viscous fluid-sealed damper shown in FIG. 8.
Figure 9B:
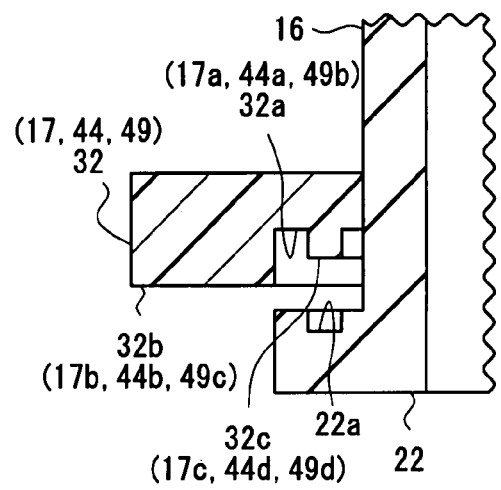
FIG. 9B is an enlarged explanatory view of a modification example of the sealing member and the container main body of FIG. 9A.

FIGS. 8, 9A, and 9B

FIGS. 8 and 9 show a viscous fluid-sealed damper 31 according to a fifth embodiment. A viscous fluid-sealed damper 31 according to a fifth embodiment of the present invention differs from the viscous fluid-sealed damper 24 of the second embodiment in the structure of a sealing member 32. Otherwise, this embodiment is of the same construction and effects as the second embodiment and the first embodiment.

As in the sealing member 17 of the second embodiment, an annular lock surface portion 32a to be engaged with the flange portion 22 is provided at the inner edge of the lower end of the sealing member 32, and the lower end surface of the sealing member 32 except for the lock surface portion 32a constitutes a fixation surface portion 32b to be fixed to the lid member 25. However, unlike the lock surface portion 17a of the sealing member 17, the lock surface portion 32a is equipped with an annular press protrusion 32c directed toward the lid member 25 so as to extend in the direction in which the flange portion 22 is compressed.

Due to the same construction as that of the viscous fluid-sealed damper 24 of the second embodiment, the viscous fluid-sealed damper 31 of the fifth embodiment provides the same effects as those of the second embodiment. Further, the construction peculiar to this embodiment provides the following effect.

In the viscous fluid-sealed damper 31, due to the provision of the press protrusion 32c on the sealing member 32, it is possible to strongly compress a part of the flange portion 22, thereby making it possible to enhance the sealing pressure of the flange portion 22 and the lid member 25. Thus, the liquid-tightness of the sealing container 15 is enhanced, and the viscous fluid 10 is hardly allowed to leak.

Modification Example of Fifth Embodiment

While in the viscous fluid-sealed damper 31 of the fifth embodiment, as shown in FIG. 9A, the flat surface of the flange portion 22 is pressed by the press protrusion 32c of the sealing member 32, in a modification example of the fifth embodiment, as shown in FIG. 9B, it is possible to provide the flange portion 22 with an engagement groove 22a to be fit-engaged with the press protrusion 32c. According to this structure, through engagement of the press protrusion 32c and the engagement groove 22a, it is possible to effect positioning accurately on the flange portion 22 with respect to the sealing member 32. Further, in this modification example, the depth of the engagement groove 22a is somewhat smaller than the height of the press protrusion 32c, so it is possible to strongly compress the flange portion 22, thereby making it possible to enhance the liquid-tightness of the flange portion 22 and the lid member 25.

Sixth Embodiment

Figure 10:
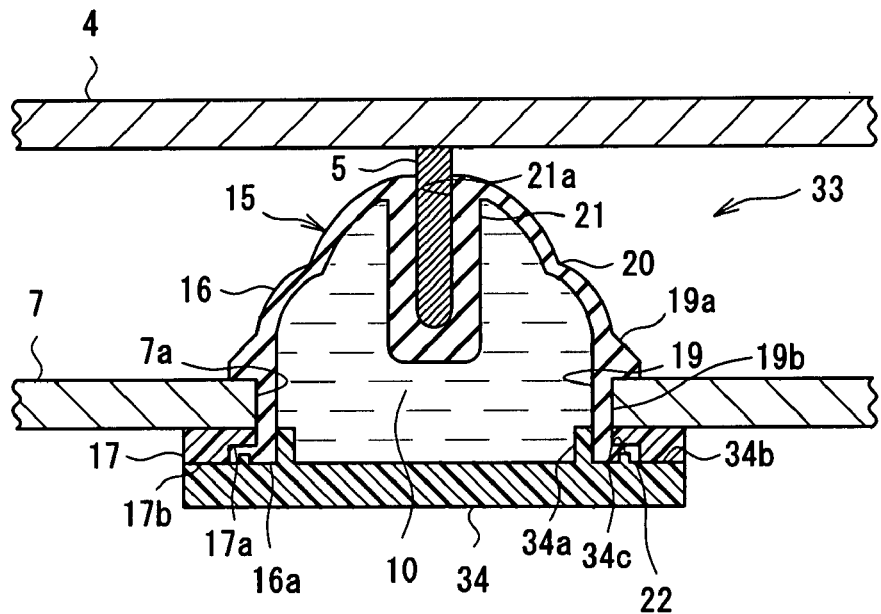
FIG. 10 is a sectional view corresponding to FIG. 2 of a viscous fluid-sealed damper according to a sixth embodiment of the present invention.

FIGS. 10 and 11

FIGS. 10 and 11 show a viscous fluid-sealed damper 33 according to a sixth embodiment. A viscous fluid-sealed damper 33 according to a sixth embodiment of the present invention differs from the viscous fluid-sealed damper 24 of the second embodiment in the structure of a lid member 34. Otherwise, this embodiment is of the same construction and effects as the second embodiment and the first embodiment.

Like the lid member 25 of the second embodiment, the lid member 34 has an annular endless protruding wall portion 34a protruding into the container main body 16 and held in contact with the inner peripheral surface of the peripheral wall portion 19 of the container main body 16. The portion of the lid member 34 opposed to the fixation surface portion 17b of the sealing member 17 constitutes a fixation surface portion 34b. However, unlike the lid member 25, the lid member 34 is provided with an annular press protrusion 34c directed toward the sealing member 17 so as to extend in the direction in which the flange portion 22 is compressed, whereby the flat surface of the flange portion 22 is pressurized.

Due to the same construction as that of the viscous fluid-sealed damper 24 of the second embodiment, the viscous fluid-sealed damper 33 of the sixth embodiment provides the same effects as those of the second embodiment. Further, the construction peculiar to this embodiment provides the following effect.

In the viscous fluid-sealed damper 33, the lid member 34 is equipped with the press protrusion 34c, so it is possible to strongly compress a part of the flange portion 22, thereby making it possible to enhance the sealing pressure of the flange portion 22 and the lid member 34. Thus, the liquid-tightness of the sealing container 15 is enhanced, and the viscous fluid 10 is hardly allowed to leak.

Modification Example of Sixth Embodiment

Figure 11A:
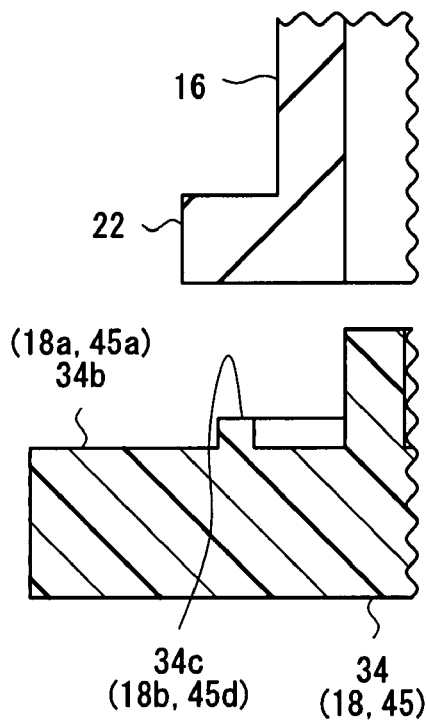
FIG. 11A is an enlarged explanatory view of a lid member and a container main body of the viscous fluid-sealed damper shown in FIG. 10.
Figure 11B:
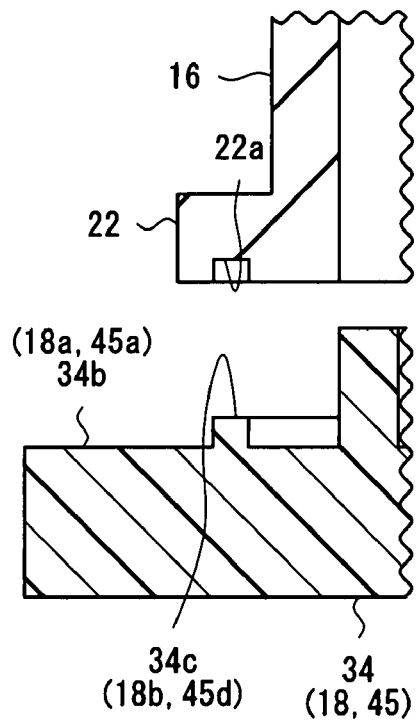
FIG. 11B is an enlarged explanatory view of a modification example of the lid member and the container main body.

While in the viscous fluid-sealed damper 33 of the sixth embodiment, as shown in FIG. 11A, the flat surface of the flange portion 22 is pressurized by the press protrusion 34c of the lid member 34, in a modification example of the sixth embodiment, as shown in FIG. 11B, it is possible to provide an engagement groove 22a to be fit-engaged with the press protrusion 34c in the surface of the flange portion 22 opposed to the press protrusion 34c. In this case, through engagement of the press protrusion 34c and the engagement groove 22a, it is possible to effect positioning accurately on the lid member 34 with respect to the flange portion 22. Further, due to the fit-engagement of the flange portion 22 and the lid member 34, it is possible to cause the engagement surface to meander, whereby the engagement area can be increased. Thus, it is possible to enhance the liquid-tightness of the flange portion 22 and the lid member 34, so liquid leakage hardly occurs. Further, by making the depth of the engagement groove 22a somewhat smaller than the height of the press protrusion 34c, it is possible to strongly compress the flange portion 22 with the press protrusion 34c, thereby making it possible to enhance the liquid-tightness of the flange portion 22 and the lid member 34.

Seventh Embodiment

Figure 12:
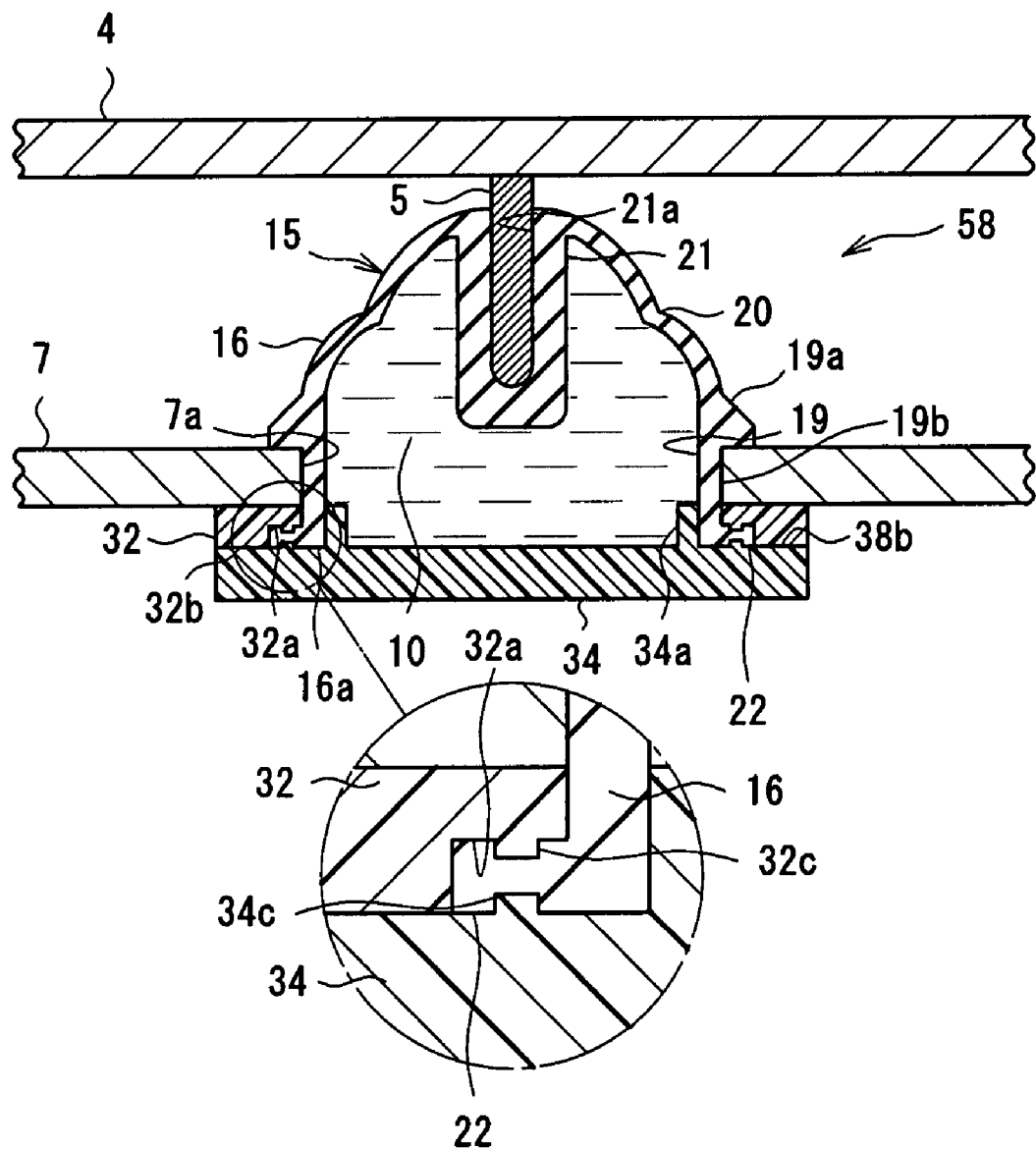
FIG. 12 is a sectional view of a viscous fluid-sealed damper according to a seventh embodiment of the present invention, which corresponds to FIG. 2 illustrating the first embodiment, while a portion thereof is partially enlarged.
Figure 13A:
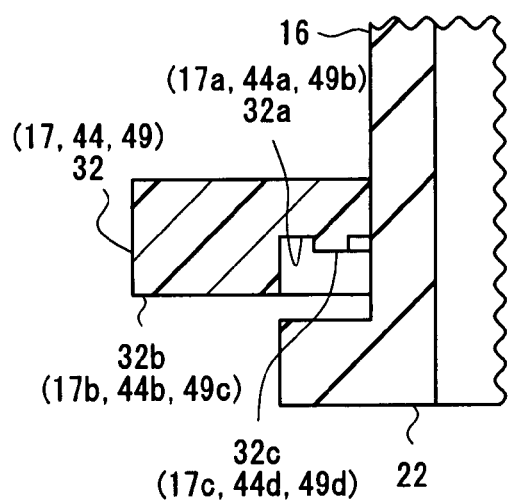
FIG. 13A is an enlarged explanatory view of a sealing member, a lid member, and a container main body of the viscous fluid-sealed damper shown in FIG. 12.
Figure 13A:
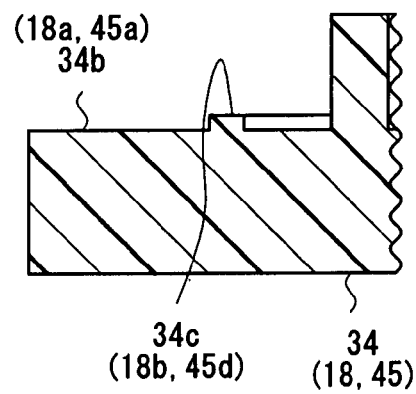

FIGS. 12 and 13A

FIGS. 12 and 13A show a viscous fluid-sealed damper 58 according to a seventh embodiment. The viscous fluid-sealed damper 58 differs from the viscous fluid-sealed damper 31 of the fifth embodiment in the structure of the lid member 34. Otherwise, this embodiment is of the same construction and effects as the fifth embodiment and the first embodiment.

The lid member 34 is the one as used in the sixth embodiment, and has an endless annular protruding wall portion 34a protruding into the container main body 16 and held in contact with the inner peripheral surface of the peripheral wall portion 19 of the container main body 16. The portion of the lid member 34 opposed to the fixation surface portion 32b of the sealing member 32 constitutes a fixation surface portion 34b. Further, there is provided an annular press protrusion 34c directed to the sealing member 32 so as to extend in the direction in which the flange portion 22 is compressed, whereby the flat surface of the flange portion 22 is pressurized.

Due to the same construction as that of the viscous fluid-sealed damper 31 of the fifth embodiment, the viscous fluid-sealed damper 58 of the seventh embodiment provides the same effects as those of the fifth embodiment. Further, the construction peculiar to the seventh embodiment provides the following effect.

In the viscous fluid-sealed damper 58, the sealing member 32 is provided with a press protrusion 32c, and the lid member 34 is provided with the press protrusion 34c, so it is possible to strongly compress a part of the flange portion 22, making it possible to enhance the sealing pressure of the flange portion 22 and the lid member 34. Thus, the liquid-tightness of the sealing container 15 is enhanced, making it relatively free from leakage of the viscous fluid 10.

Modification Example of Seventh Embodiment

FIG. 13B

Figure 13B:
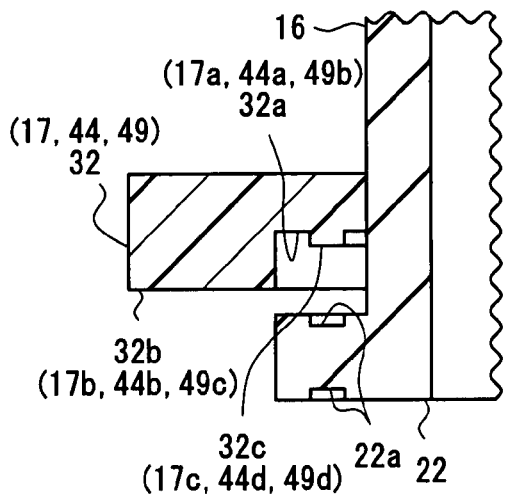
FIG. 13B is an enlarged explanatory view of a modification example of the sealing member, the lid member, and the container main body of FIG. 13A.
Figure 13B:
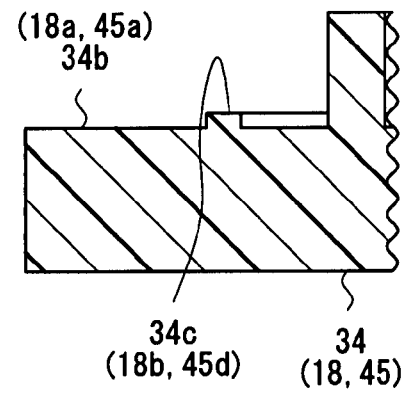

While in the viscous fluid-sealed damper 58 of the seventh embodiment the flat surface of the flange portion 22 is pressurized by the press protrusion 32c of the sealing member 32 and the press protrusion 34c of the lid member 34 as shown in FIG. 13A, in a modification example of the seventh embodiment, as shown in FIG. 13B, the flange portion 22 is provided with an engagement groove 22a to be fit-engaged with the press protrusion 32c and an engagement groove 22a to be fit-engaged with the press protrusion 34c. In this construction, the press protrusion 32c and the press protrusion 34c are respectively engaged with the engagement grooves 22a, whereby it is possible to correctly effect positioning on the sealing member 32 and the lid member 34 with respect to the flange portion 22. Further, in this modification example, the depth of the engagement groove 22a is somewhat smaller than the height of the press protrusion 32c, so it is possible to strongly compress the flange portion 22, making it possible to enhance the liquid-tightness of the flange portion 22 and the lid member 25. Further, due to the fit-engagement of the flange portion 22 and the lid member 34, it is possible to cause the engagement surface to meander, thereby enlarging the engagement area. Thus, it is possible to enhance the liquid tightness of the flange portion 22 and the lid member 34, and liquid leakage hardly occurs.

Eighth Embodiment

Figure 14:
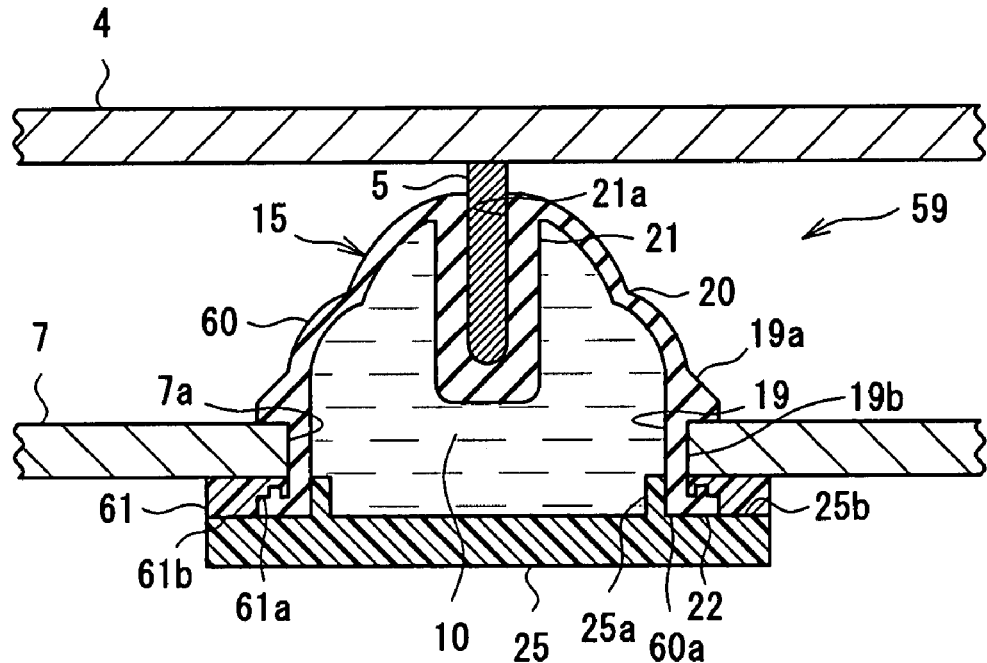
FIG. 14 is a sectional view of a viscous fluid-sealed damper according to an eighth embodiment of the present invention, which corresponds to FIG. 2 illustrating the first embodiment.
Figure 15:
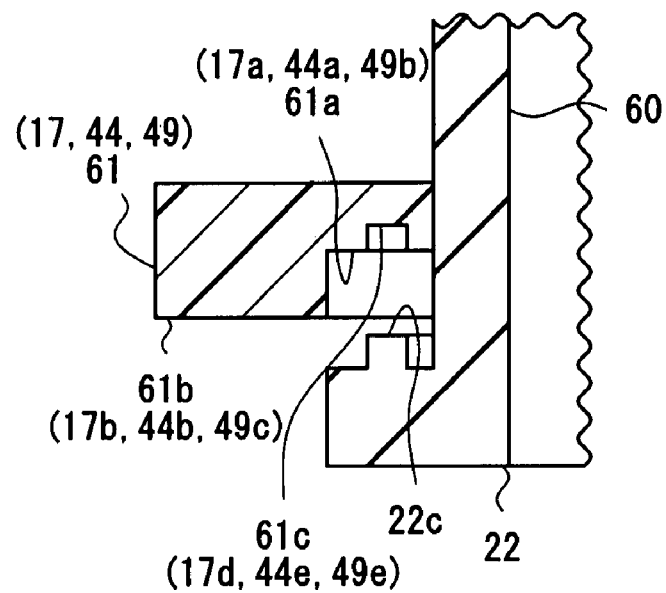
FIG. 15 is an enlarged explanatory view of a sealing member and a container main body of the viscous fluid-sealed damper shown in FIG. 14.

FIGS. 14 and 15

FIGS. 14 and 15 show a viscous fluid-sealed damper 59 according to an eighth embodiment. The viscous fluid-sealed damper 59 of the eighth embodiment differs from the viscous fluid-sealed damper 24 of the second embodiment in the structure of a container main body 60 and a sealing member 61. Otherwise, this embodiment is of the same construction and effects as the second embodiment and the first embodiment.

Like the container main body 16 of the second embodiment, the container main body 60 is formed of a butyl rubber in a hollow-bowl-like configuration with one end open, and starting from the opening end 60a side, there are formed the peripheral wall portion 19, the flexible portion 20, and the central mounting portion 21 in this order. However, unlike the container main body 16, the container main body 60 has, in the surface of the flange portion 22 opposed to a lock surface portion 61a of a sealing member 61, an annular protrusion 22c directed toward the lock surface portion 61a.

As in the sealing member 17 of the second embodiment, there is provided at the inner edge of the lower end of the sealing member 61 the annular lock surface portion 61a to be engaged with the flange portion 22, and the lower end surface of the sealing member 61 except for the lock surface portion 61a constitutes a fixation surface portion 61b to be fixed to the lid member 25. However, unlike the lock surface portion 17a of the sealing member 17, the lock surface portion 61a is provided with an engagement groove 61c to be fit-engaged with the protrusion 22c of the flange portion 22.

Due to the same construction as the viscous fluid-sealed damper 24 of the second embodiment, the viscous fluid-sealed damper 59 of the eighth embodiment provides the same effects as those of the second embodiment. Further, the construction peculiar to this embodiment provides the following effect.

In the viscous fluid-sealed damper 59, the sealing member 61 is provided with an engagement groove 61c, and the flange portion 22 is provided with the protrusion 22c, so it is possible to strongly compress a part of the flange portion 22, making it possible to enhance the sealing pressure of the flange portion 22 and the lid member 25. Thus, the liquid-tightness of the sealing container is enhanced, and the viscous fluid 10 hardly leaks.

Through engagement of the protrusion 22c and the engagement groove 61c, it is possible to perform positioning on the flange portion 22 with respect to the sealing member 61. Further, the depth of the engagement groove 61c is somewhat smaller than the height of the protrusion 22c, so it is possible to strongly compress the flange portion 22, making it possible to enhance the liquid-tightness of the flange portion 22 and the lid member 25.

Ninth Embodiment

Figure 16:
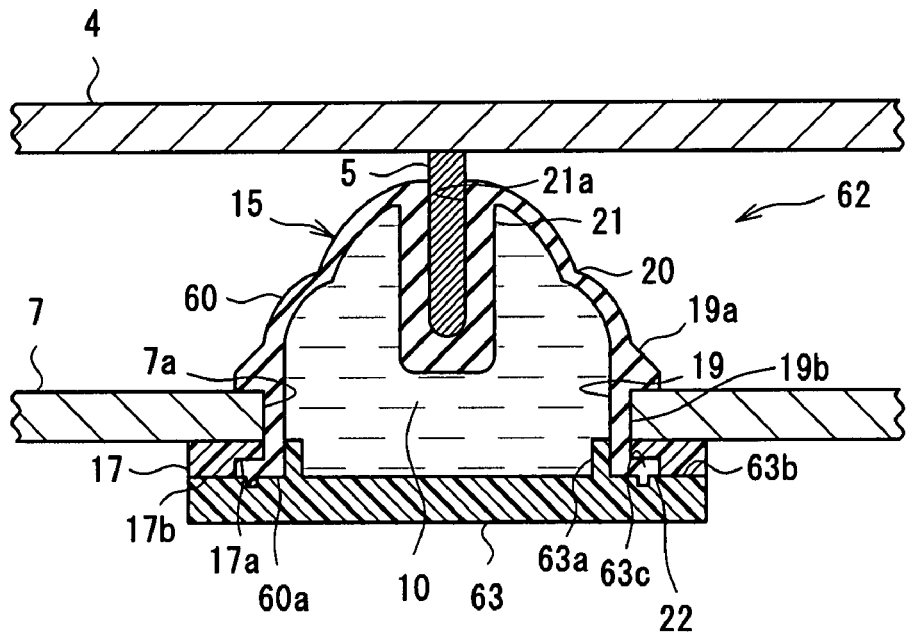
FIG. 16 is a sectional view of a viscous fluid-sealed damper according to a ninth embodiment of the present invention, which corresponds to FIG. 2 illustrating the first embodiment.
Figure 17:
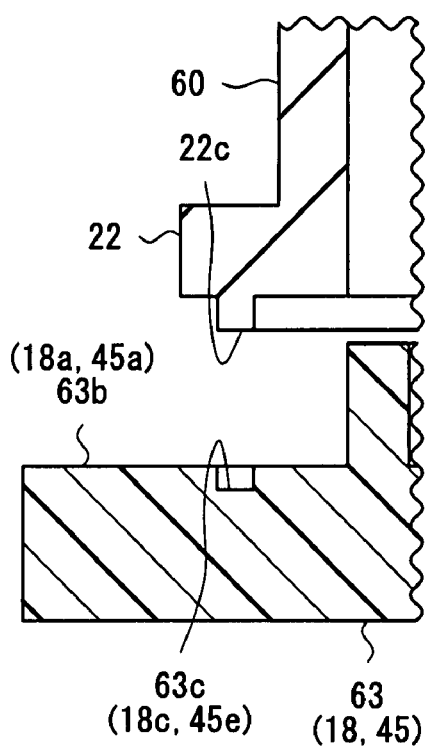
FIG. 17 is an enlarged explanatory view of a lid member and a container main body of the viscous fluid-sealed damper shown in FIG. 16.

FIGS. 16 and 17

FIGS. 16 and 17 show a viscous fluid-sealed damper 62 according to a ninth embodiment. The viscous fluid-sealed damper 62 of the ninth embodiment differs from the viscous fluid-sealed damper 24 of the second embodiment in the structure of the container main body 60 and a lid member 63. Otherwise, it is of the same construction and effects as the second embodiment and the first embodiment.

Like the container main body 16 of the second embodiment, the container main body 60 is formed of a butyl rubber in a hollow-bowl-like configuration with one end open, and starting from the opening 60a side, there are formed the peripheral wall portion 19, the flexible portion 20, and the central mounting portion 21 in this order. However, unlike the container main body 16, the container main body 60 has, in the surface of the flange portion 22 opposed to the lid member 63, an annular protrusion 22c directed toward the lid member 63.

Like the lid member 25 of the second embodiment, the lid member 63 has an annular endless protruding wall portion 63a protruding into the container main body 60 and held in contact with the inner peripheral surface of the peripheral wall portion 19 of the container main body 60. The portion of the lid member 63 opposed to the fixation surface portion 17b of the sealing member 17 constitutes a fixation surface portion 63b. However, unlike the lid member 25, the lid member 63 is equipped with an engagement groove 63c to be fit-engaged with the protrusion 22c of the flange portion 22.

Due to the same construction as that of the viscous fluid-sealed damper 24 of the second embodiment, the viscous fluid-sealed damper 62 of the ninth embodiment provides the same effects as those of the second embodiment. Further, the construction peculiar to this embodiment provides the following effects.

In the viscous fluid-sealed damper 62, the lid member 63 is provided with the engagement groove 63c, and the flange portion 22 is equipped with the protrusion 22c, so it is possible to strongly compress a part of the flange portion 22, making it possible to enhance the sealing pressure of the flange portion 22 and the lid member 25. Thus, the liquid-tightness of the sealing container 15 is enhanced, and the viscous fluid 10 hardly leaks. Further, due to the fit-engagement of the flange portion 22 and the lid member 63, it is possible to cause the engagement surface to meander, making it possible to enlarge the engagement area. Thus, it is possible to enhance the liquid-tightness of the flange portion 22 and the lid member 63, and liquid leakage hardly occurs.

Through engagement of the protrusion 22c and the engagement groove 63c, it is possible to perform positioning correctly on the flange portion 22 with respect to the lid member 63. Further, in this embodiment, the depth of the engagement groove 63c is somewhat smaller than the height of the protrusion 22c, so it is possible to strongly compress the flange portion 22, making it possible to enhance the liquid-tightness of the flange portion 22 and the lid member 25.

Tenth Embodiment

Figure 18:
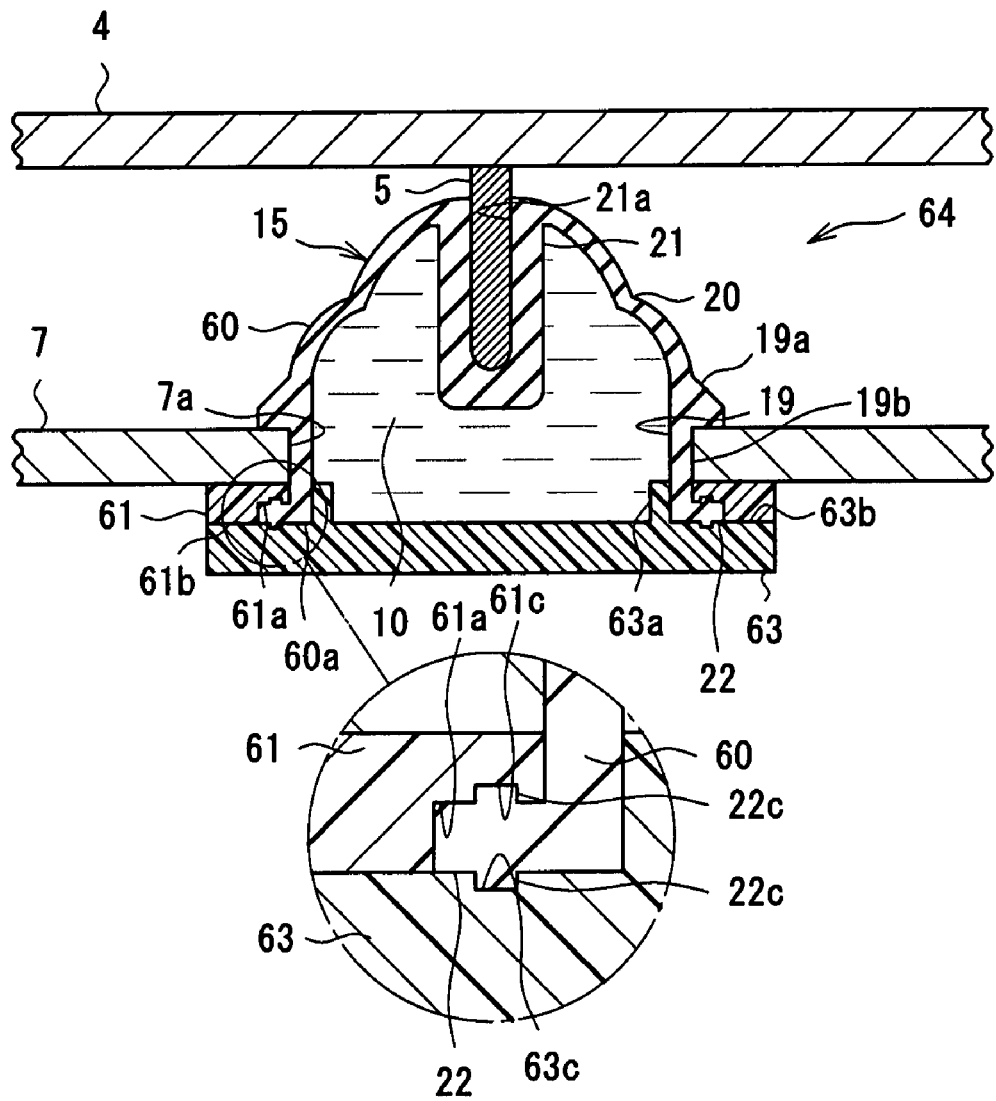
FIG. 18 is a sectional view of a viscous fluid-sealed damper according to a tenth embodiment of the present invention, which corresponds to FIG. 2 illustrating the first embodiment, while a portion thereof is partially enlarged.
Figure 19:
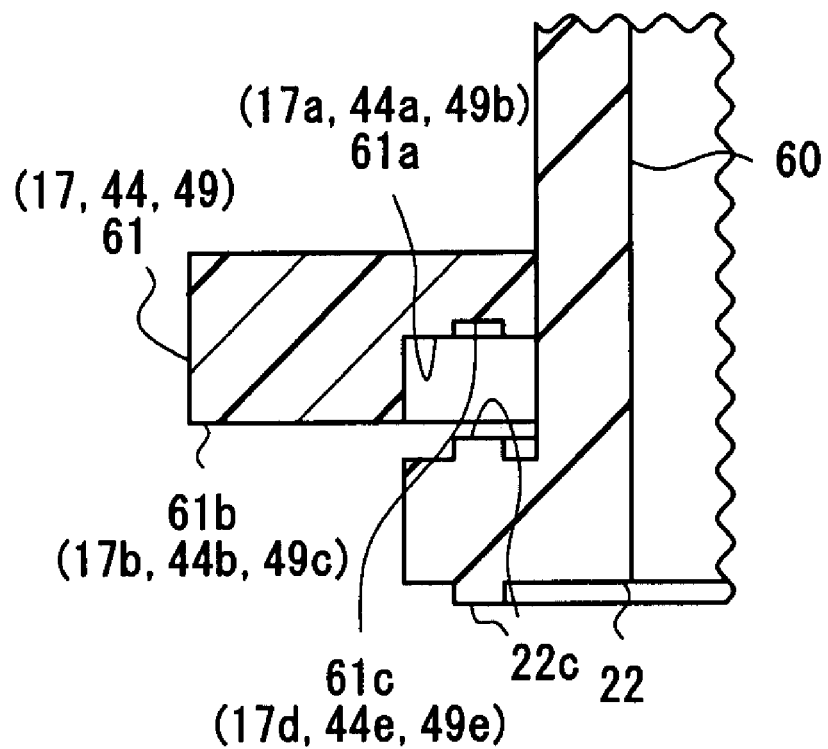
FIG. 19 is an enlarged explanatory view of a sealing member and a lid member of the viscous fluid-sealed damper shown in FIG. 18.
Figure 19:
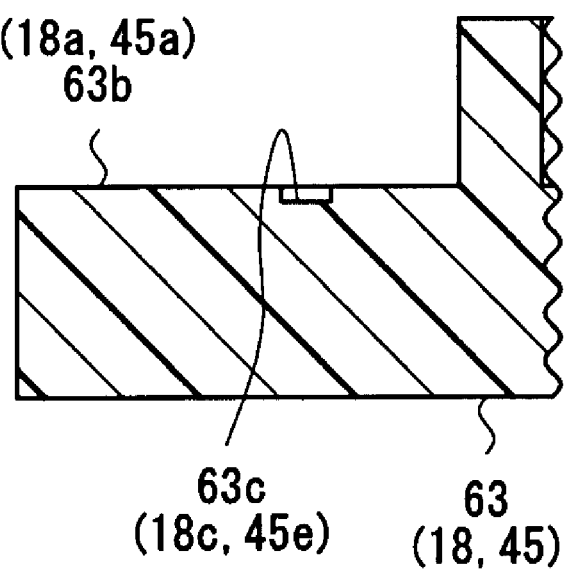

FIGS. 18 and 19

FIGS. 18 and 19 show a viscous fluid-sealed damper 64 according to a tenth embodiment. The viscous fluid-sealed damper 64 of the tenth embodiment differs from the viscous-fluid-sealed viscous fluid-sealed damper 24 of the second embodiment in the structure of the container main body 60, the sealing member 61, and the lid member 63. Otherwise, it is of the same construction and effects as the second embodiment and the first embodiment.

Like the container main body 16 of the second embodiment, the container main body 60 is formed of a butyl rubber in a hollow-bowl-like configuration with one end open, and starting from the opening 60a side thereof, there are formed the peripheral wall portion 19, the flexible portion 20, and the central mounting portion 21 in this order. However, unlike the container main body 16, the container main body 60 has an annular protrusion 22c directed toward the lock surface portion 61a in the surface of the flange portion 22 opposed to the lock surface portion 61a of the sealing member 61, and an annular protrusion 22c directed toward the lid member 63 in the surface of the flange portion 22 opposed to the lid member 63.

As stated above, the sealing member 61 is provided with an annular lock surface portion 61a to be engaged with the flange portion 22, and the lower end surface of the sealing member 61 except for the lock surface portion 61a constitutes a fixation surface portion 61b to be fixed to the lid member 63. Further, the sealing member 61 is provided with an engagement groove 61c to be fit-engaged with the protrusion 22c of the flange portion 22.

As stated above, the lid member 63 has the annular endless protruding wall portion 63a protruding into the container main body 60 and held in contact with the inner peripheral surface of the peripheral wall portion 19 of the container main body 60, and the portion of the lid member 63 opposed to the fixation surface portion 61b of the sealing member 61 constitutes a fixation surface portion 63b. Further, the lid member 63 is provided with an engagement groove 63c to be fit-engaged with the protrusion 22c of the flange portion 22.

Due to the same construction as that of the viscous-fluid-sealed viscous fluid-sealed damper 24 of the second embodiment, the viscous-fluid-sealed viscous fluid-sealed damper 64 of the tenth embodiment provides the same effects as those of the second embodiment. Further, the construction peculiar to this embodiment provides the following effects.

In addition to the effects of the viscous fluid-sealed damper 59, the viscous fluid-sealed damper 64 can provide the effects of the viscous fluid-sealed damper 62. That is, due to the provision of the protrusions 22c on both the surface of the flange portion 22 opposed to the sealing member 61 and the surface thereof opposed to the lid member 63, it is possible to strongly compress a part of the flange portion 22, making it possible to enhance the sealing pressure of the flange portion 22 and the lid member 63. Thus, the liquid-tightness of the sealing container 15 is enhanced, and the viscous fluid 10 hardly leaks. Further, due to the fit-engagement of the flange portion 22 and the lid member 63, it is possible to cause the engagement surface to meander, thereby increasing the engagement area. Thus, it is possible to enhance the liquid-tightness of the flange portion 22 and the lid member 63, and liquid leakage hardly occurs.

Through the engagement of the protrusions 22c with the engagement grooves 61c and 63c, it is possible to effect positioning correctly on the flange portion 22 with respect to the sealing member 61 and the lid member 63. Further, in this embodiment, the depth of each of the engagement grooves 61c and 63c is somewhat smaller than the height of the protrusions 22c, so it is possible to strongly compress the flange portion, making it possible to enhance the liquid-tightness of the flange portion 22 and the lid member 63.

Eleventh Embodiment

FIG. 20

Figure 20:
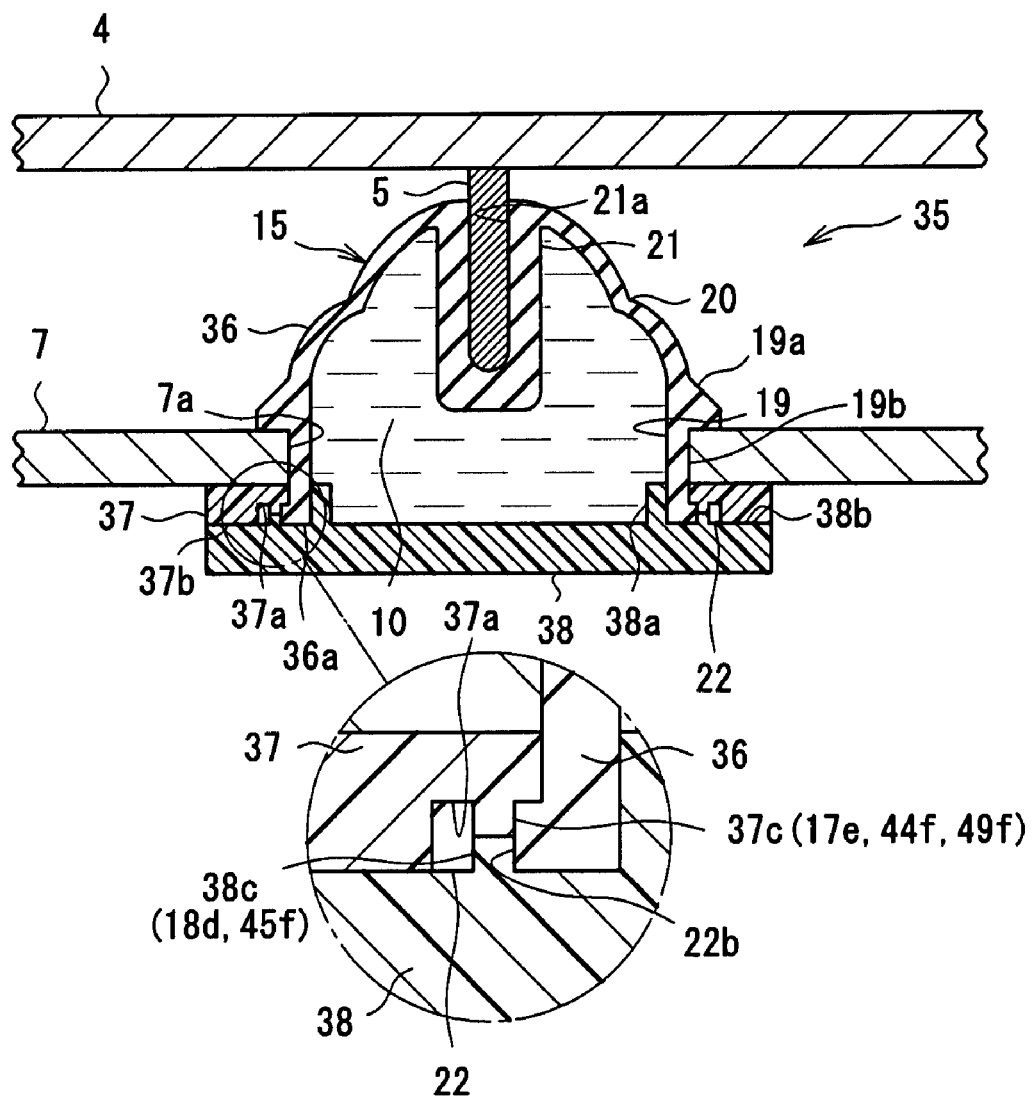
FIG. 20 is a sectional view of a viscous fluid-sealed damper according to an eleventh embodiment of the present invention, which corresponds to FIG. 2 illustrating the first embodiment, while a portion thereof is partially enlarged.

FIG. 20 shows a viscous fluid-sealed damper 35 according to an eleventh embodiment. A viscous fluid-sealed damper 35 according to an eleventh embodiment of the present invention differs from the viscous fluid-sealed damper 24 of the second embodiment in the structure of a container main body 36, a sealing member 37, and a lid member 38. Otherwise, this embodiment is of the same construction and effects as the second embodiment and the first embodiment.

Like the container main body 16 of the second embodiment, the container main body 36 is formed of a butyl rubber, and is formed in a hollow-bowl-like configuration, and includes, starting from an opening end 36a side, the peripheral wall portion 19, the flexible portion 20, and the central mounting portion 21 formed in this order. However, unlike the container main body 16, the container main body 36 is formed with a through-hole 22b extending in the thickness direction of the flange portion 22.

Like the sealing member 17 of the second embodiment, the sealing member 37 has, at the inner edge of the lower end of the sealing member 37, a recessed lock surface portion 37a to be engaged with the flange portion 22. The lower end surface of the sealing member 37 except for the lock surface portion 37a constitutes a fixation surface portion 37b to be fixed to the lid member 38. The depth of the lock surface portion 37a as measured in the thickness direction of the sealing member 37 is somewhat smaller than the thickness of the flange portion 22 before the container main body 36 is sealed with the lid member 38. When the container main body 36 is sealed with the lid member 38, the flange portion 22 is compressed and held between the sealing member 37 and the lid member 38. However, unlike the sealing member 17, the sealing member 37 is equipped with a plurality of columnar protrusions 37c which are directed toward the lid member 38 so as to extend in the compressing direction of the flange portion 22 and which are inserted into the through-hole 22b of the flange portion 22. The height dimension of the fixation protrusions 37c is approximately half the depth dimension of the lock surface portion 37a as measured in the thickness direction of the sealing member 37.

Like the lid member 25 of the second embodiment, the lid member 38 has an annular protruding wall portion 38a which protrudes into the container main body 16 and which is held in contact with the inner peripheral surface of the peripheral wall portion 19 of the container main body 16. The portion of the lid member 38 opposed to the fixation surface portion 37b of the sealing member 37 constitutes a fixation surface portion 38b. However, unlike the lid member 25, the lid member 38 is equipped with a plurality of columnar fixation protrusions 38c which are directed toward the sealing member 37 so as to extend in the compressing direction of the flange portion 22 and which are inserted into the through-hole 22b of the flange portion 22. The height dimension of the fixation protrusions 38c is approximately half the depth dimension of the lock surface portion 37a as measured in the thickness direction of the sealing member 37. Further, the fixation surface portion 38b of the lid member 38 is fixed to the fixation surface portion 37b of the sealing member 37 by ultrasonic fusion-bonding, thereby closing the opening end 36a of the container main body 36. At the same time, the distal ends of the fixation protrusions 38c of the lid member 38 and the distal ends of the fixation protrusions 37c of the sealing member 37 are also fixed to each other by ultrasonic fusion-bonding. Those two fixations through ultrasonic fusion-bonding can be simultaneously effected by a single ultrasonic fusion-bonding process.

Due to the same construction as that of the viscous fluid-sealed damper 24 of the second embodiment, the viscous fluid-sealed damper 35 of the eleventh embodiment provides the same effects as those of the second embodiment. Further, the construction peculiar to this embodiment provides the following effect.

In the viscous fluid-sealed damper 35, there are inserted in the through-hole 22b of the flange portion 22 the fixation protrusions 37c and 38c for fixing the sealing member 37 and the lid member 38 to each other, so it is possible to accurately effect positioning on the sealing member 37 and the lid member 38 with respect to the flange portion 22. Further, since the fixation protrusions 37c and 38c are fixed to each other in the through-hole 22b of the flange portion 22, it is possible to firmly assemble together the container main body 36, the sealing member 37, and the lid member 38 through physical fit-engagement.

Modification Example of Eleventh Embodiment

Figure 21A:
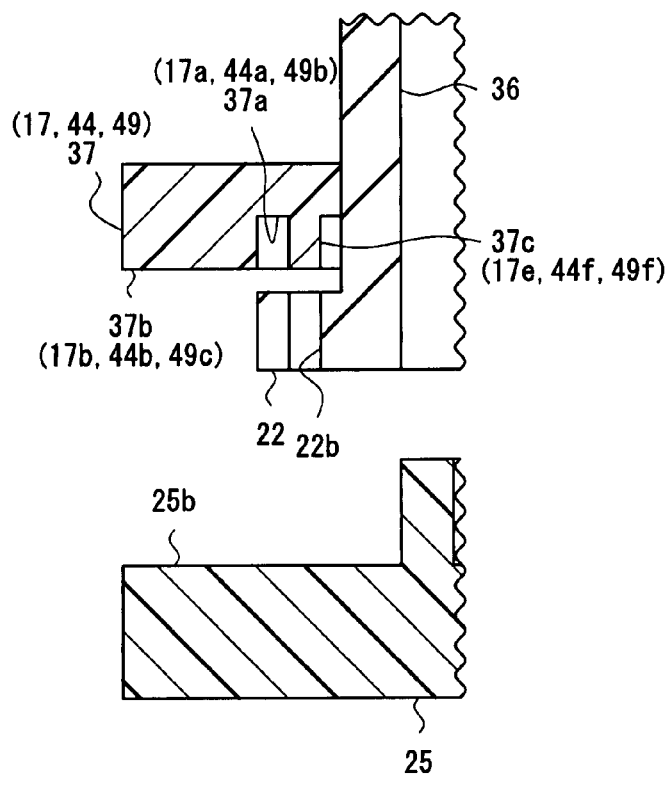
FIG. 21A is an enlarged explanatory view of a sealing member, a lid member, and a container main body of a modification example of the sealed-in viscous fluid shown in FIG. 20.
Figure 21B:
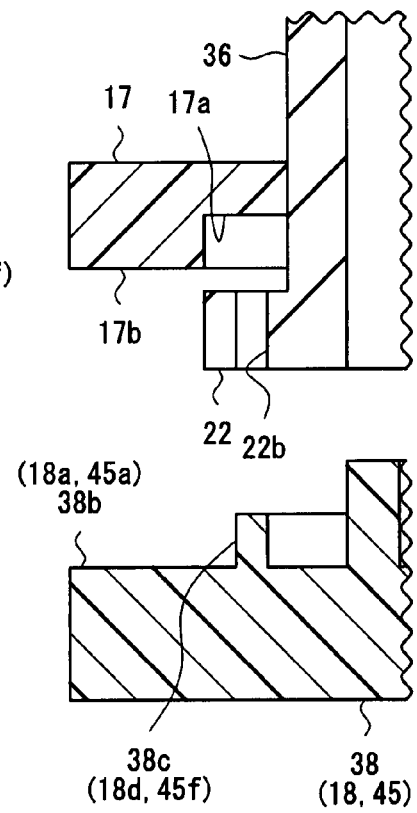
FIG. 21B is an enlarged explanatory view of another modification example of a sealing member, a lid member, and a container main body of the viscous fluid-sealed damper shown in FIG. 20.

FIGS. 21A and 21B

While in the viscous fluid-sealed damper 35 of the eleventh embodiment the fixation protrusions 37c and 38c are provided on the sealing member 37 and the lid member 38, respectively, in a modification example of the eleventh embodiment, the fixation protrusion is provided on one of the two members. That is, as shown in FIG. 21A, it is possible to provide the sealing member 37 with the fixation protrusion 37c having a height dimension equal to the depth dimension of the lock surface portion 37a as measured in the thickness direction of the sealing member 37, or, as shown in FIG. 21B, it is possible to provided the lid member 38 with the fixation protrusion 38c having a height dimension equal to the depth dimension of the lock surface portion 17a as measured in the thickness direction of the sealing member 17. In this construction, there is no need to perform positioning on the container main body 36 with respect to the other of the members not provided with the fixation protrusion 37c or 38c, and it is possible to physically fit-engage the container main body 36, the sealing member 37, and the lid member 38 with each other, making it possible to firmly assemble them with each other.

Twelfth Embodiment

FIG. 22

Figure 22:
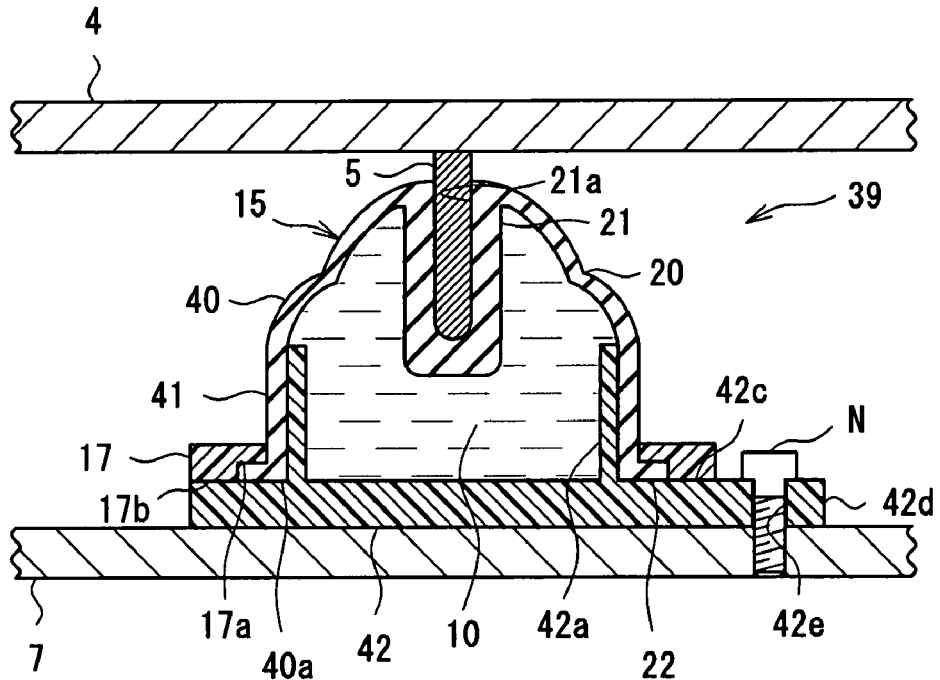
FIG. 22 is a sectional view corresponding to FIG. 2 of a viscous fluid-sealed damper according to a twelfth embodiment of the present invention.

FIG. 22 shows a viscous fluid-sealed damper 39 according to a twelfth embodiment. A viscous fluid-sealed damper 39 according to a twelfth embodiment of the present invention includes a modification example of the viscous fluid-sealed damper 24 of the second embodiment. It differs from the second embodiment in the mounting structure of a peripheral wall portion 41 of a container main body 40, a lid member 42, and the viscous fluid-sealed damper 39. Otherwise, this embodiment is of the same construction and effects as the second embodiment and the first embodiment.

As in the second embodiment, at the lower end of the peripheral wall portion 41 of this embodiment, there is formed the flange portion 22 extending over the entire periphery. No protrusion 19a is formed at the upper end of the peripheral wall portion 41, nor is there any mounting groove portion 19b formed.

As in the case of the lid member 25 of the second embodiment, a protruding wall portion 42a is formed on the lid member 42. The protruding wall portion 42a includes a plurality of arcuate divisional members (FIG. 5B), and deairing gap portions 42b are also formed. The protruding wall portion 42a protrudes to a larger degree than the protruding wall portion 25a of the second embodiment and the protruding wall portion 30a of the fourth embodiment, and protrudes from the inner surface of the lid member 42 beyond the sealing member 17 in its thickness direction to reach the upper end of the peripheral wall portion 41 (the boundary portion between the peripheral wall portion 41 and the flexible portion 20). The outer surface of the protruding wall portion 42a and the inner surface of the peripheral wall portion 41 are merely held in contact with each other, and are not fixed to each other by adhesive or the like. The portion of the lid member 42 opposed to the fixation surface portion 17b of the sealing member 17 constitutes a fixation surface portion 42c, and the fixation surface portions 17b and 42c are fixed to each other by ultrasonic fusion-bonding, whereby the lid member 42 and the sealing member 17 are integrally fixed to each other, and the sealing container 15 is sealed so as to be liquid-tight. Further, the lid member 42 has a mounting member 42d protruding outwards in a tongue-like fashion, and in the mounting member 42d, there is formed a through-hole 42e, through which a mounting screw N is passed.

Next, the manner in which the viscous fluid-sealed damper 39 of this embodiment is mounted will be described. When mounting the viscous fluid-sealed damper 39, the mounting shaft 5 provided on the mechanical chassis 4 and formed of a hard resin or metal is inserted into the accommodation recess 21a of the central mounting portion 21, whereby the container main body 40 of the sealing container 15 is fixed to the mechanical chassis 4. Further, when the mounting screw N is inserted into the through-hole 42e of the lid member 42 and threadedly engaged with the screw hole of the casing 7, the head portion of the mounting screw N is engaged with the lid member 42, whereby the lid member 42 of the sealing container 15 is fixed to the casing 7. As a result, the viscous fluid-sealed damper 39 is mounted between the mechanical chassis 4 and the casing 7.

Due to the same construction as that of the viscous fluid-sealed damper 24 of the second embodiment, the viscous fluid-sealed damper 39 of the twelfth embodiment provides the same effects as those of the second embodiment. Further, the construction peculiar to this embodiment provides the following effect.

The protruding wall portion 42a of the viscous fluid-sealed damper 39 has a height dimension that is substantially equal to that of the peripheral wall portion 41. Thus, if, for example, vibration or impact is applied in the horizontal direction of FIG. 12, it is possible to effect overall suppression of deformation of the peripheral wall portion 41 toward a cylindrical axis thereof in the height direction of the peripheral wall portion 41, so the flange portion 22 provided on the opening end side of the container main body 40 can be held more reliably in a compressed state.

Thirteenth Embodiment

FIG. 23

Figure 23:
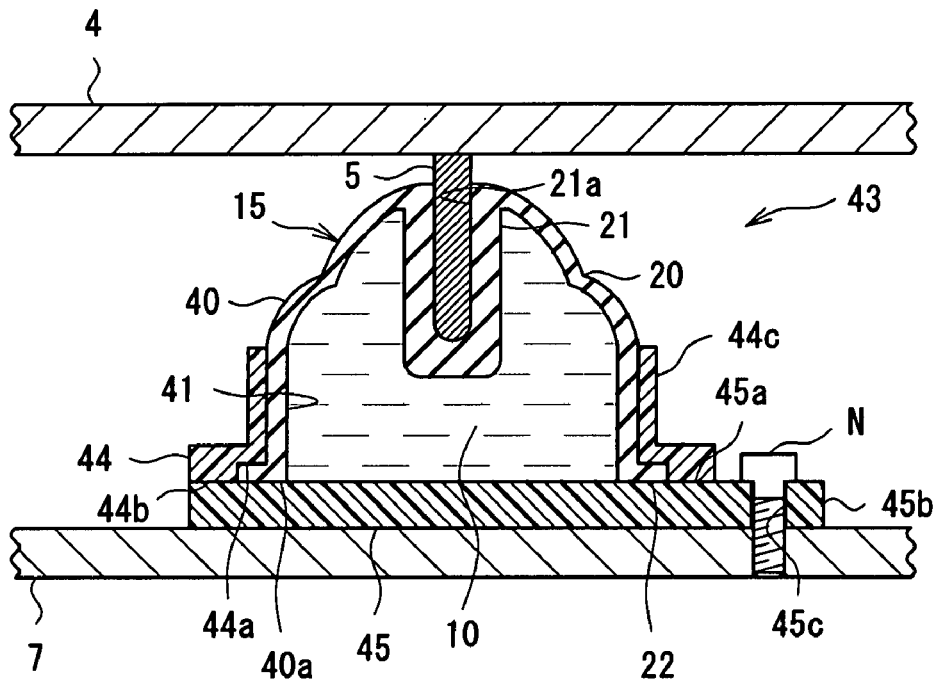
FIG. 23 is a sectional view corresponding to FIG. 2 of a viscous fluid-sealed damper according to a thirteenth embodiment of the present invention.

FIG. 23 shows a viscous fluid-sealed damper 43 according to an thirteenth embodiment. A viscous fluid-sealed damper 43 according to a ninth embodiment of the present invention includes a modification example of the viscous fluid-sealed damper 14 of the first embodiment. It differs from the first embodiment in the structure of the container main body 40, a sealing member 44, and a lid member 45, and in the mounting structure of the viscous fluid-sealed damper 43. Of those, the container main body 40 and the mounting structure are the same as those of the twelfth embodiment as described above. Otherwise, this embodiment is of the same construction and effects as the first embodiment.

At the inner edge of the lower end of a sealing member 44, there is formed a recessed lock surface portion 44a to be engaged with the flange portion 22, and the portion of the lower end surface of the sealing member 44 except for the lock surface portion 44a constitutes a fixation surface portion 44b to be fixed to the lid member 45. The depth of the lock surface portion 44a in the thickness direction (the axial direction of the sealing member 44) of the sealing member 44 is somewhat smaller than the thickness of the flange portion 22 before the container main body 40 is sealed with the lid member 45. And the sealing member 44 has an outer peripheral wall portion 44c protruding to the side of the outer peripheral surface of the peripheral wall portion 41 of the container main body 40. The height dimension of the outer wall portion 44c is equal to that of the peripheral wall portion 41. The outer wall portion 44c is formed in an endless annular configuration, and the inner peripheral surface thereof is in contact with the outer peripheral surface of the peripheral wall portion 41 over the entire periphery thereof. The inner peripheral surface of the outer wall portion 44c and the outer peripheral surface of the peripheral wall portion 41 are merely held in contact with each other, and they are not fixed to each other by adhesive or the like.

The portion of the lid member 45 opposed to the fixation surface portion 44b of the sealing member 44 constitutes a fixation surface portion 45a. Further, as in the twelfth embodiment described above, the lid member 45 has a mounting member 45b for fixing the viscous fluid-sealed damper 43 by means of the mounting screw N, and the mounting member 45b has a through-hole 45c.

Due to the same construction as that of the viscous fluid-sealed damper 14 of the first embodiment, the viscous fluid-sealed damper 43 of the thirteenth embodiment provides the same effects as those of the first embodiment. Further, the construction peculiar to this embodiment provides the following effect.

In the viscous fluid-sealed damper 43, the sealing member 44 is equipped with the outer wall portion 44c protruding to the side of the outer peripheral surface of the peripheral wall portion 41 of the container main body 40, so if the peripheral wall portion 41 of the container main body 40 receives, for example, vibration or impact and threatens to undergo deformation so as to outwardly fall to a large degree over the entire height thereof, it is possible to prevent such deformation by virtue of the outer wall portion 44c. Thus, it is possible to provide a vibration damping property similar to that of the viscous fluid-sealed damper 14 of the first embodiment.

First Modification Example of Thirteenth Embodiment

FIG. 24

Figure 24:
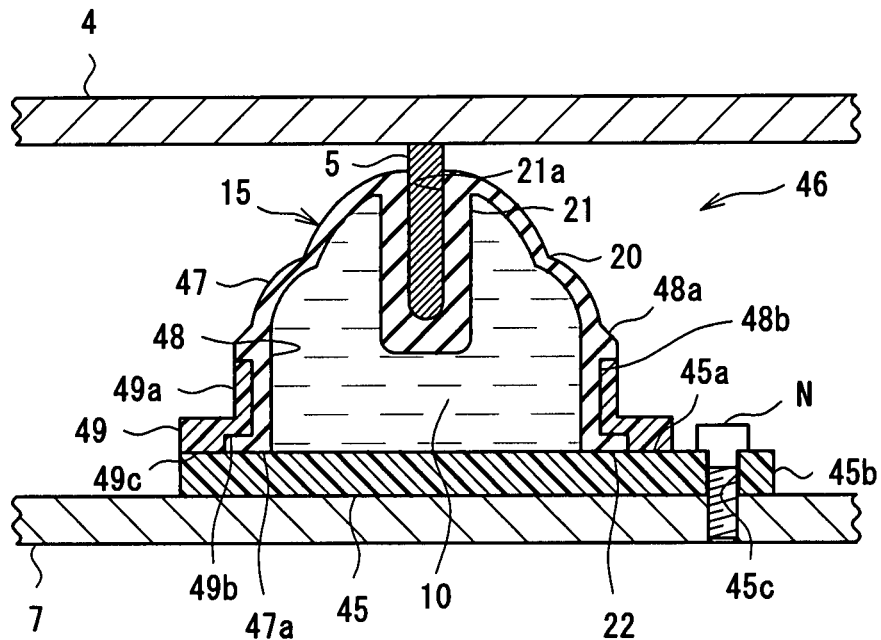
FIG. 24 is a sectional view corresponding to FIG. 2 of a first modification example of the viscous fluid-sealed damper of the thirteenth embodiment of the present invention.

As shown in FIG. 24, in a viscous fluid-sealed damper 46 according to a first modification example of the thirteenth embodiment, there is provided, at the upper end of a peripheral wall portion 48 of a container main body 47, a thick annular protrusion 48a protruding outwards and engaged with the upper end surface of an outer wall portion 49a. Between the protrusion 48a and the flange portion 22, there is formed an annular groove portion 48b to extend over the entire periphery, and the outer wall portion 49a of a sealing member 49 is engaged therewith.

The viscous fluid-sealed damper 46 of the first modification example of the ninth embodiment can provide the following specific effect. In the viscous fluid-sealed damper 43 of the thirteenth embodiment described above, when the mechanical chassis 4 or the casing 7 makes relative movement in the horizontal direction of FIG. 23 as a result, for example, of violent vibration or impact, and the flexible portion 20 and the upper end side portion of the peripheral wall portion 41 are deformed so as to be swollen outwards beyond the outer wall portion 44c, they are swollen outwards while bent at the edge portion of the upper end of the outer wall portion 44c formed of a hard resin. If this is excessively repeated, there is a fear of rupture at the bent portion. In contrast, in the first modification example of the ninth embodiment, the flexible portion 20 can be swollen and deformed outwardly starting from the border portion between the thick protrusion 48a and the thin flexible portion 20, so there is no fear of such a problem as mentioned above, thus making it possible to enhance the durability of the container main body 47.

Second Modification Example of Thirteenth Embodiment

FIG. 25

Figure 25:
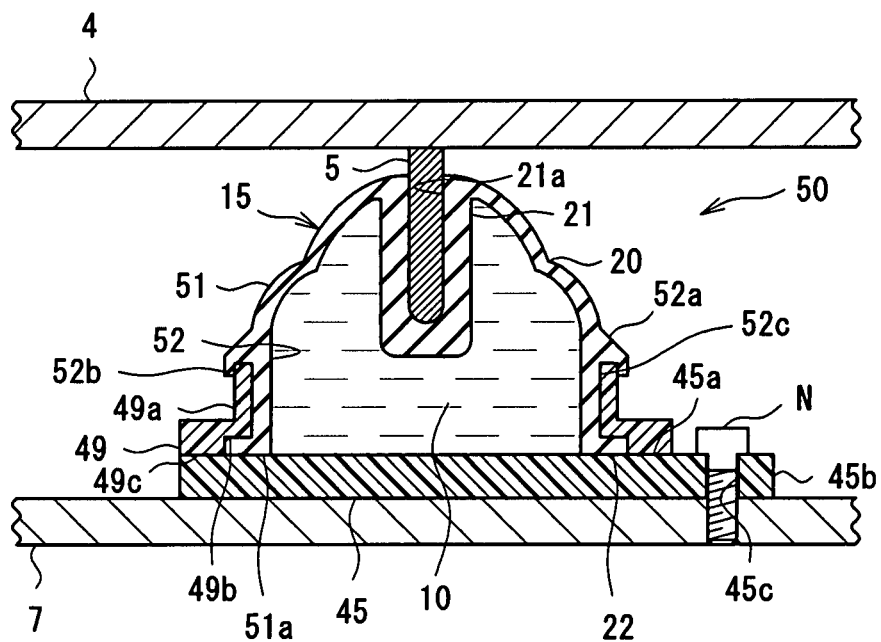
FIG. 25 is a sectional view corresponding to FIG. 2 of a second modification example of the viscous fluid-sealed damper of the thirteenth embodiment of the present invention.

As shown in FIG. 25, in a viscous fluid-sealed damper 50 according to a second modification example of the thirteenth embodiment, there is provided, at the upper end of a peripheral wall portion 52 of a container main body 51, a thick annular protrusion 52a protruding outwardly and engaged with the upper end surface and the outer peripheral surface of the outer wall portion 49a. The protrusion 52a has a lock portion 52b, which is held in intimate contact with and locked to the outer peripheral surface of the outer wall portion 49a. Further, between the protrusion 52a and the flange portion 22, there is formed an annular groove portion 52c over the entire periphery, and the outer wall portion 49a of the sealing member 49 is engaged with the groove portion 52c and is held by the lock portion 52b so as not to be detached therefrom.

In the viscous fluid-sealed damper 50 of the second modification example of the ninth embodiment, it is possible to fix the container main body 51 formed of a rubber-like elastic material in position while holding the container main body 51 in intimate contact with the sealing member 49 formed of a hard resin. Thus, the peripheral wall portion 52 is hardly deformed on the opening end side of the container main body 51, so it is possible to provide a vibration damping property similar to that of the viscous fluid-sealed damper 14 of the first embodiment.

Third Modification Example of Thirteenth Embodiment

FIG. 26

Figure 26:
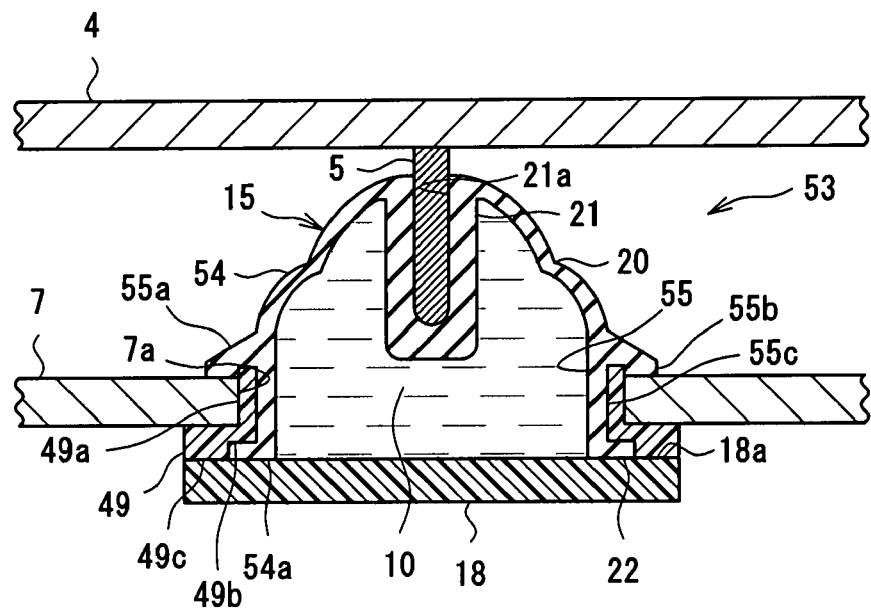
FIG. 26 is a sectional view corresponding to FIG. 2 of a third modification example of the viscous fluid-sealed damper of the thirteenth embodiment of the present invention.

As shown in FIG. 26, in a viscous fluid-sealed damper 53 according to a third modification example of the thirteenth embodiment, there is formed, at the upper end of a peripheral wall portion 55 of a container main body 54, a protrusion 55a obtained by further swelling outwardly the lock portion 52b of the protrusion 52a of the second modification example of the ninth embodiment.

As in the second modification example of the ninth embodiment, a lock portion 55b of the protrusion 55a is locked to the outer peripheral surface of the outer wall portion 49a of the sealing member 49 fitted into an annular groove portion 55c, fixing the container main body 54 formed of a rubber-like elastic material to the sealing member 49 formed of a hard resin. In addition, the lock portion 55b of the third modification example of the ninth embodiment is locked to the hole edge of the through-hole 7a of the casing 7, thus also helping to prevent detachment of the viscous fluid-sealed damper 53.

While the lid member 18 of the viscous fluid-sealed damper 53 of this modification example is the same as that of the first embodiment, it is also possible to use the lid member 45 with the mounting member 45b as used in the thirteenth embodiment as described above. In this case, with the single viscous fluid-sealed damper 53, it is advantageously possible to select between the mounting mode in which the viscous fluid-sealed damper 53 is mounted into the through-hole 7a of the casing 7 (FIG. 26) and the mounting mode in which the viscous fluid-sealed damper 53 is fixed to the casing 7 by a screw (FIG. 23).

Fourteenth Embodiment

FIG. 27

Figure 27:
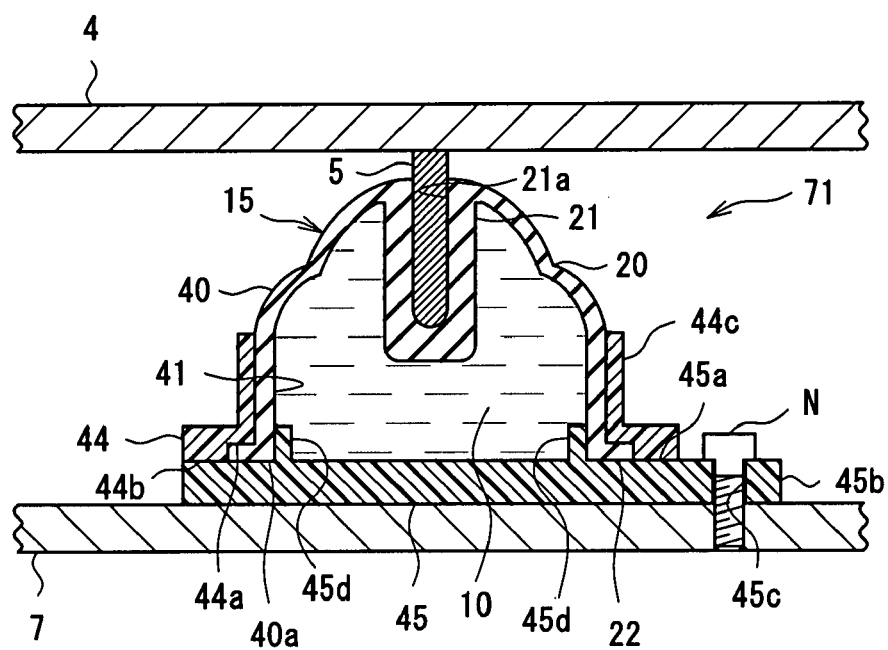
FIG. 27 is a sectional view corresponding to FIG. 2 of a viscous fluid-sealed damper according to a fourteenth embodiment of the present invention.
Figure 28:
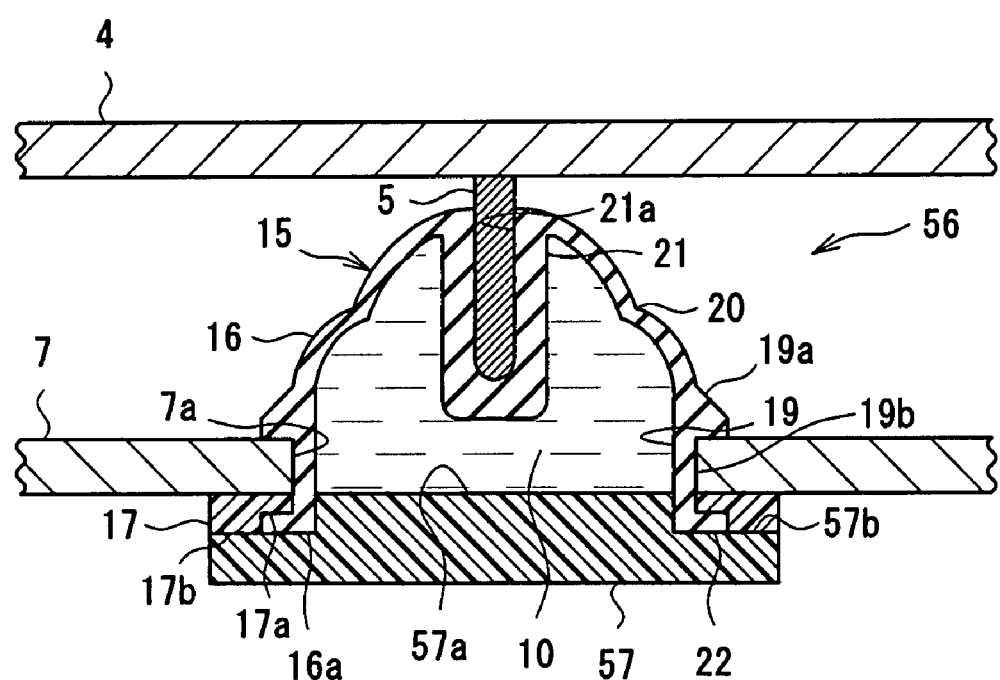
FIG. 28 is a sectional view corresponding to FIG. 2 of a fifth modification example of a viscous fluid-sealed damper common to the embodiments of the present invention.
Figure 29:
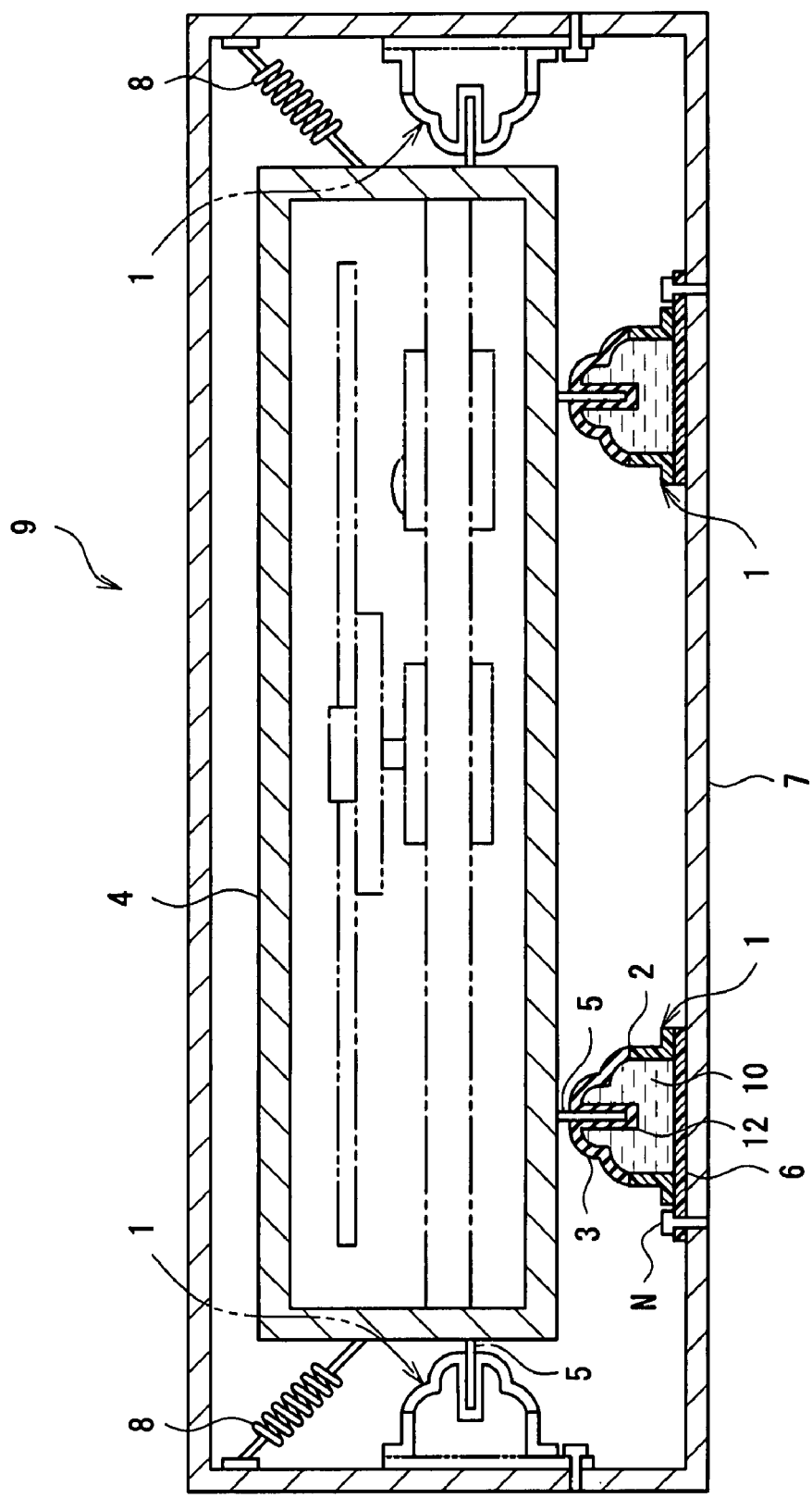
FIG. 29 is an explanatory view of a disk device to which a conventional viscous fluid-sealed damper is mounted.
Figure 30:
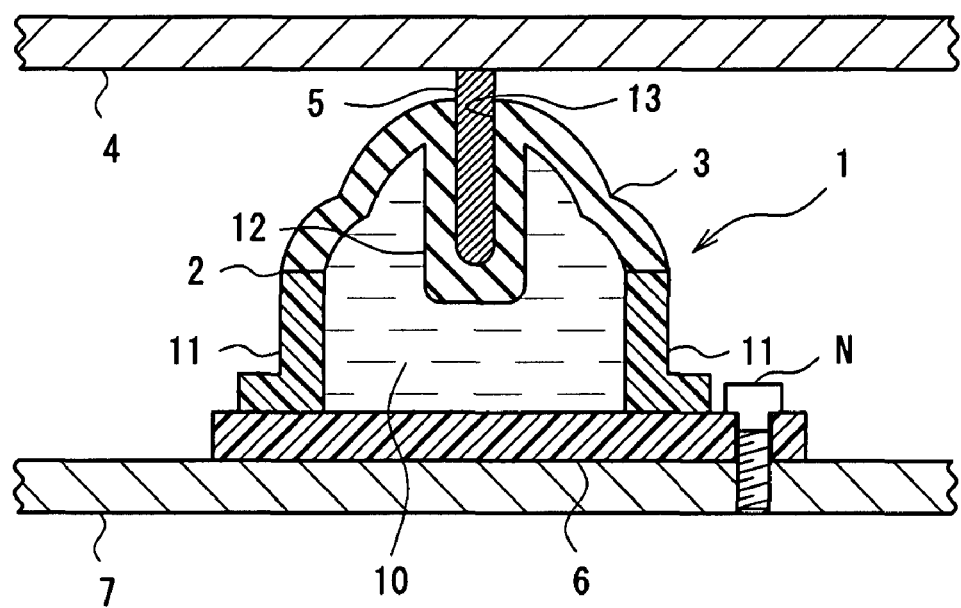
FIG. 30 is a sectional view of the viscous fluid-sealed damper shown in FIG. 28.

FIG. 27 shows a viscous fluid-sealed damper 71 according to a fourteenth embodiment. A viscous fluid-sealed damper 71 according to a fourteenth embodiment of the present invention includes modification examples of the viscous fluid-sealed damper 43 of the thirteenth embodiment and the viscous fluid-sealed damper 24 of the second embodiment.

At the inner edge of the lower end of a sealing member 44, there is formed a recessed lock surface portion 44a to be engaged with the flange portion 22, and the portion of the lower end surface of the sealing member 44 except for the lock surface portion 44a constitutes a fixation surface portion 44b to be fixed to the lid member 45. The depth of the lock surface portion 44a in the thickness direction (the axial direction of the sealing member 44) of the sealing member 44 is somewhat smaller than the thickness of the flange portion 22 before the container main body 40 is sealed with the lid member 45. And the sealing member 44 has an outer peripheral wall portion 44c protruding to the side of the outer peripheral surface of the peripheral wall portion 41 of the container main body 40. The outer wall portion 44c is formed in an endless annular configuration, and the inner peripheral surface thereof is in contact with the outer peripheral surface of the peripheral wall portion 41 over the entire periphery thereof. The inner peripheral surface of the outer wall portion 44c and the outer peripheral surface of the peripheral wall portion 41 are merely held in contact with each other, and they are not fixed to each other by adhesive or the like.

The portion of the lid member 45 opposed to the fixation surface portion 44b of the sealing member 44 constitutes a fixation surface portion 45a. Further, as in the twelfth embodiment described above, the lid member 45 has a mounting member 45b for fixing the viscous fluid-sealed damper 43 by means of the mounting screw N, and the mounting member 45b has a through-hole 45c.

Formed on the lid member 45 is a protruding wall portion 45d of an endless annular configuration protruding into the container main body 40 and held in contact with the inner peripheral surface of the peripheral wall portion 41 of the container main body 40. The outer peripheral surface of the opening end 40a of the container main body 40 is pressed by the sealing member 44 compressing and holding the flange portion 22 of the peripheral wall portion 41, and the inner peripheral surface thereof is pressed by the protruding wall portion 45d.

Due to the same constructions as that of the viscous fluid-sealed damper 14 of the first embodiment, the viscous fluid-sealed damper 24 of the second embodiment, and the viscous fluid-sealed damper 43 of the thirteenth embodiment, the viscous fluid-sealed damper 71 of the fourteenth embodiment provides the same effects as those of those embodiments.

First Modification Example Common to Above Embodiments

While in the viscous fluid-sealed damper 14, 24, 27, 29, 31, 33, 35, 39, 43, 46, 50, 53, 58, 59, 62, 64, or 71 of each of the first through fourteenth embodiments (including the modification examples thereof the mounting shaft 5 is inserted into the accommodation recess 21a provided in the central mounting portion 21 to fix the central mounting portion 21 to the mechanical chassis 4, in a first modification example common to the above embodiments, a mounting protrusion protruding from the outer surface of the central mounting portion 21 is provided, and the mounting protrusion is inserted into a mounting hole provided in the mechanical chassis 4 to thereby fix the central mounting portion 21 to the mechanical chassis 4. In this case, it is possible to eliminate the agitating portion, thereby achieving a reduction in the thickness of the viscous fluid-sealed damper.

Second Modification Example Common to Above Embodiments

While in the viscous fluid-sealed damper 14, 24, 27, 29, 31, 33, 35, 58, 59, 62 or 64 of each of the first through seventh embodiments (including the modification examples thereof the mounting groove portion 19b provided in the peripheral wall portion 19 is engaged with the through-hole 7a of the casing 7 to thereby fix the peripheral wall portion 19 to the casing 7, in a second modification example common to the above embodiments, a mounting hole is provided in at least one of the sealing member 17, 32, 37, or 61 and the lid member 18, 25, 28, 30, 34, 38, or 63 and a mounting screw is threadedly engaged with the mounting hole and with the mounting hole provided in the casing 7 to thereby fix the lid member 18, 25, 28, 30, 34, 38, or 63 to the casing 7. This also helps to obtain the same effects as those of the above-described embodiments.

Third Modification Example Common to Above Embodiments

While in the viscous fluid-sealed damper 14, 24, 27, 29, 31, 33, 35, 39, 43, 46, 50, 53, 58, 59, 62, 64, or 71 of each of the first through fourteenth embodiments (including the modification examples thereof) the central mounting portion 21 is fixed to the mechanical chassis 4, and the peripheral wall portion 19 is fixed to the casing 7, in a third modification example common to the above embodiments, the mounting shaft 5 of the casing 7 is inserted into the accommodation recess 21a provided in the central mounting portion 21 to thereby fix the central mounting portion 21 to the casing 7, and the mounting groove portion 19b provided in the peripheral wall portion 19 is engaged with the through-hole of the mechanical chassis 4 to thereby fix the peripheral wall portion 19 to the mechanical chassis 4. Further, when the mounting screw N is inserted into the through-hole 42e of the lid member 42 and threadedly engaged with the screw hole of the mechanical chassis 4, thereby fix the peripheral wall portion 19 to the mechanical chassis 4. These also help to obtain the same effects as those of the above embodiments.

Fourth Modification Example Common to Above Embodiments

While in the viscous fluid-sealed damper 14, 24, 27, 29, 31, 33, 35, 39, 43, 46, 50, 53, 58, 59, 62, 64 or 71 of each of the first through fourteenth embodiments (including the modification examples thereof) the fixation surface portion 17b, 32b, 37b, 44b, or 61b of the sealing member 17, 32, 37, 44, 49, or 61 and the fixation surface portion 18a, 25b, 28b, 30c, 34b, 38b, 42c, 45a, or 63b of the lid member 18, 25, 28, 30, 34, 38, 42, 45, or 63 are fixed to each other by ultrasonic fusion-bonding, in a fourth modification example common to the above embodiments, the fixation surface portion 17b, 32b, 37b, 44b, or 61b of the sealing member 17, 32, 37, 44, 49, or 61 and the fixation surface portion 18a, 25b, 28b, 30c, 34b, 38b, 42c, 45a, or 63b of the lid member 18, 25, 28, 30, 34, 38, 42, 45, or 63 are respectively fixed to each other by adhesive.

Fifth Modification Example Common to Above Embodiments

In the viscous fluid-sealed damper 24, 27, 29, 31, 33, 35, 58, 59, 62, or 64 of each of the second through eleventh embodiments (including the modification examples thereof the protruding wall portion 25a, 28a, 30a, 34a, 38a, or 63a of the lid member 25, 28, 30, 34, 38, or 63 is formed in an annular configuration, in a viscous fluid-sealed damper 56 according to a fifth modification example common to the above embodiments, as shown in FIG. 27, a protruding wall portion 57a of a lid member 57 is formed in a columnar configuration.

Sixth Modification Example Common to Above Embodiments

While the viscous fluid-sealed damper 14, 39, 43, 46, 50, 53, or 71 of each of the first, twelfth, thirteenth, and fourteenth embodiments (including the modification examples thereof is equipped with the sealing member 17, 44, or 49, in a sixth modification example common to the above embodiments, the lock surface portion 17a, 44a, or 49b of the sealing member 17, 44, or 49 is provided with an annular press protrusion 17c, 44d, or 49d directed toward the lid member 18, 42, or 45 so as to extend in the compressing direction of the flange portion 22 as in the case of the sealing member 32 (see FIG. 9A). In this construction, due to the provision of the press protrusion 17c, 44d, or 49d on the sealing member 17, 44, or 49, it is possible to strongly compress a part of the flange portion 22, making it possible to enhance the sealing pressure of the flange portion 22 and the lid member 25. Thus, the liquid-tightness of the sealing container 15 is enhanced, and the viscous fluid 10 hardly leaks.

Seventh Modification Example Common to Above Embodiments

While in the above sixth modification example of the viscous fluid-sealed damper 14, 39, 43, 46, 50, 53, or 71 of each of the first, twelfth, thirteenth and fourteenth embodiments (including the modification examples thereof the flat surface of the flange portion 22 is pressurized by the press protrusion 17c, 44d, or 49d of the sealing member 17, 44, or 49, in a seventh modification example common to the above embodiments, the flange portion 22 is provided with an engagement groove 22a to be fit-engaged with the press protrusion 17c, 44d, or 49d (see FIG. 9B). In this construction, through engagement of the press protrusion 17c, 44d, or 49d and the engagement groove 22a, it is possible to effect position correctly on the flange portion 22 with respect to the sealing member 17, 44, or 49. Further, in this modification example, the depth of the engagement groove 22a is somewhat smaller than the height of the press protrusion 17c, 44d, or 49d, so it is possible to strongly compress the flange portion 22, making it possible to enhance the liquid-tightness of the flange portion 22 and the lid member 18, 42, or 45.

Eighth Modification Example Common to Above Embodiments

While the viscous fluid-sealed damper 14, 39, 43, 46, 50, or 53 of each of the first, twelfth, thirteenth, and fourteenth embodiments (including the modification examples thereof is equipped with the lid member 18, 42, or 45, in an eighth modification example common to the above embodiments, the lid member 18, 42, or 45 is provided with an annular press protrusion 18b or 45d directed toward the sealing member 17, 44, or 49 so as to extend in the compressing direction of the flange portion 22 as in the case of the lid member 34 (see FIG. 11A). In this construction, the lid member 18, 42, or 45 is provided with the press protrusion 18b or 45d, so it is possible to strongly compress a part of the flange portion 22, making it possible to enhance the sealing pressure of the flange portion 22 and the lid member 18, 42, or 45. Thus, the liquid-tightness of the sealing container 15 is enhanced, and the viscous fluid 10 hardly leaks.

Ninth Modification Example Common to Above Embodiments

While in the above eighth modification example of the viscous fluid-sealed damper 14, 39, 43, 46, 50, 53, or 71 of each of the first, twelfth, thirteenth, and fourteenth embodiments (including the modification examples thereof) the flat surface of the flange portion 22 is pressurized by the press protrusion 18b or 45d of the lid member 18, 42, or 45, in a ninth modification example common to the above embodiments, the flange portion 22 is provided with an engagement groove 22a to be fit-engaged with the press protrusion 18b or 45d (see FIG. 11B). In this construction, through engagement of the press protrusion 18b or 45d and the engagement groove 22a, it is possible to correctly effect positioning on the lid member 18, 42, or 45 with respect to the flange portion 22. Further, due to the fit-engagement of the flange portion 22 and the lid member 18, 42, or 45, it is possible to cause the engagement surface to meander, thereby increasing the engagement area. Thus, it is possible to enhance the liquid-tightness of the flange portion 22 and the lid member 18 or 45, and liquid leakage hardly occurs. Further, by making the depth of the engagement groove 22a somewhat smaller than the height of the press protrusion 18b or 45d, it is possible to strongly compress the flange portion 22 with the press protrusion 18b or 45d making it possible to enhance the liquid-tightness of the flange portion 22 and the lid member 18, 42, or 45.

Tenth Modification Example Common to Above Embodiments

While the viscous fluid-sealed damper 14, 39, 43, 46, 50, 53, or 71 of each of the first, twelfth, thirteenth, and fourteenth embodiments (including the modification examples thereof) is equipped with the sealing member 17, 44, or 49 and the lid member 18, 42, or 45, in a tenth modification example common to the above embodiments, the lock surface portion 17a, 44a, or 49b of the sealing member 17, 44, or 49 is provided with an annular press protrusion 17c, 44d, or 49d directed toward the lid member 18, 42, or 45 so as to extend in the compressing direction of the flange portion 22 as in the case of the sealing member 32, and the lid member 18, 42, or 45 is provided with an annular press protrusion 18b or 45d directed toward the sealing member 17, 44, or 49 so as to extend in the compressing direction of the flange portion 22 as in the case of the lid member 34 (see FIG. 13A). In this construction, it is possible to strongly compress a part of the flange portion 22 from both the sealing member 17, 44, or 49 side and the lid member 18, 42, or 45 side, making it possible to enhance the sealing pressure of the flange portion 22 and the lid member 18, 42, or 45. Thus, the liquid-tightness of the sealing container 15 is enhanced, and the viscous fluid 10 hardly leaks.

Eleventh Modification Example Common to Above Embodiments

While in the above tenth modification example of the viscous fluid-sealed damper 14, 39, 43, 46, 50, 53, or 71 of each of the first, twelfth, thirteenth, and fourteenth embodiments (including the modification examples thereof the flat surface of the flange portion 22 is pressurized by the press protrusion 17c, 44d, or 49d of the sealing member 17, 44, or 49 and the press protrusion 18b or 45d of the lid member 18, 42, or 45, in an eleventh modification example common to the above embodiments, the flange portion 22 is provided with engagement grooves 22a to be fit-engaged with the press protrusions 17c, 44d, 49d, 18b, or 45d (see FIG. 13B). In this construction, through engagement of the press protrusions 17c, 44d, 49d, 18b, or 45d and the engagement grooves 22a, it is possible to effect positioning correctly on the sealing member 17, 44, or 49 and the lid member 18, 42, or 45 with respect to the flange portion 22. Further, in this modification example, the depth of the engagement grooves 22a is somewhat smaller than the height of the press protrusions 17c, 44d, 49d, 18b, or 45d, so it is possible to strongly compress the flange portion 22, making it possible to enhance the liquid-tightness of the flange portion 22 and the lid member 18, 42, or 45. Further, due to the fit-engagement of the flange portion 22 and the lid member 18, 42, or 45, it is possible to cause the engagement surface to meander, thereby increasing the engagement area. Thus, it is possible to enhance the liquid-tightness of the flange portion 22 and the lid member 18, 42, or 45, and liquid leakage hardly occurs.

Twelfth Modification Example Common to Above Embodiments

While the viscous fluid-sealed damper 14, 39, 43, 46, 50, 53, or 71 of each of the first, twelfth, thirteenth, and fourteenth embodiments (including the modification examples thereof) is equipped with the sealing member 17, 44, or 49, in a twelfth modification example common to the above embodiments, on the surface of the flange portion 22 of the container main body 16, 40, 47, 51, or 54 opposed to the lock surface portion 17a, 44a, or 49b of the sealing member 17, 44, or 49, an annular protrusion 22c directed toward the lock surface portion 17a, 44a, or 49b is formed, and the lock surface portion 17a, 44a, or 49b of the sealing member 17, 44, or 49 is provided with an engagement groove 17d, 44e, or 49e to be fit-engaged with the protrusion 22c of the flange portion 22 (see FIG. 15). In this construction, it is possible to strongly compress a part of the flange portion 22, making it possible to enhance the sealing pressure of the flange portion 22 and the lid member 18 or 45. Thus, the liquid-tightness of the sealing container 15 is enhanced, and the viscous fluid 10 hardly leaks. Further, through engagement of the protrusion 22c and the engagement groove 17d, 44e, or 49e, it is possible to perform positioning correctly on the flange portion 22 with respect to the sealing member 17, 44, or 49. Further, in this modification example, the depth of the engagement groove 17d, 44e, or 49e is somewhat smaller than the height of the protrusion 22c, so it is possible to strongly compress the flange portion 22, making it possible to enhance the liquid-tightness of the flange portion 22 and the lid member 18, 42, or 45.

Thirteenth Modification Example Common to Above Embodiments

While the viscous fluid-sealed damper 14, 39, 43, 46, 50, 53, or 71 of each of the first, twelfth, thirteenth, and fourteenth embodiments (including the modification examples thereof is equipped with the lid member 18, 42, or 45, in a thirteenth modification example common to the above embodiments, on the surface of the flange portion 22 of the container main body 16, 40, 47, 51, or 54 opposed to the lid member 18, 42, or 45, an annular protrusion 22c directed toward the lid member 18, 42, or 45 is formed, and the lid member 18, 42, or 45 is provided with an engagement groove 18c or 45e to be fit-engaged with the protrusion 22c of the flange portion 22 (see FIG. 17). In this construction, it is possible to strongly compress a part of the flange portion 22, making it possible to enhance the sealing pressure of the flange portion 22 and the lid member 18, 42, or 45. Thus, the liquid-tightness of the sealing container 15 is enhanced, and the viscous fluid 10 hardly leaks. Further, due to the fit-engagement of the flange portion 22 and the lid member 18, 42, or 45, it is possible to cause the engagement surface to meander, thereby increasing the engagement area. Thus, it is possible to enhance the liquid-tightness of the flange portion 22 and the lid member 18, 42, or 45, and liquid leakage hardly occurs. Further, through engagement of the protrusion 22c and the engagement groove 18c or 45e, it is possible to perform positioning correctly on the flange portion 22 with respect to the lid member 18, 42, or 45. Further, in this modification example, the depth of the engagement groove 18c or 45e is somewhat smaller than the height of the protrusion 22c, so it is possible to strongly compress the flange portion 22, making it possible to enhance the liquid-tightness of the flange portion 22 and the lid member 18, 42, or 45.

Fourteenth Modification Example Common to Above Embodiments

While the viscous fluid-sealed damper 14, 39, 43, 46, 50, 53, or 71 of each of the first, twelfth, thirteenth, and fourteenth embodiments (including the modification examples thereof is equipped with the sealing member 17, 44, or 49 and the lid member 18, 42, or 45, in a fourteenth modification example common to the above embodiments, annular protrusions 22c are formed on the surface of the flange portion 22 of the container main body 16, 40, 47, 51, or 54 opposed to the sealing surface portion 17a, 44a, or 49b of the sealing member 17, 44, or 49 and on the surface of the flange portion 22 opposed to the lid member 18, 42, or 45, and the sealing surface portion 17a, 44a, or 49b of the sealing member 17, 44, or 49 and the lid member 18, 42, or 45 are provided with each engagement groove 17d, 44e, 49e, 18c, or 45e to be fit-engaged with the protrusions 22c (see FIG. 19). In this construction, it is possible to strongly compress a part of the flange portion 22, making it possible to enhance the sealing pressure of the flange portion 22 and the lid member 18, 42, or 45. Thus, the liquid-tightness of the sealing container 15 is enhanced, and the viscous fluid 10 hardly leaks. Further, due to the fit-engagement of the flange portion 22 and the lid member 18, 42, or 45, it is possible to cause the engagement surface to meander, thereby increasing the engagement area. Thus, it is possible to enhance the liquid-tightness of the flange portion 22 and the lid member 18, 42, or 45, and liquid leakage hardly occurs. Further, through engagement of the protrusions 22c and each engagement groove 17d, 44e, 49e, 18c, or 45e, it is possible to perform positioning correctly on the flange portion 22 with respect to the sealing member 17, 44, or 49 and the lid member 18, 42, or 45. Further, in this modification example, the depth of each engagement groove 17d, 44e, 49e, 18c, or 45e is somewhat smaller than the height of the protrusions 22c, so it is possible to strongly compress the flange portion 22, making it possible to enhance the liquid-tightness of the flange portion 22 and the lid member 18, 42, or 45.

Fifteenth Modification Example Common to Above Embodiment

While the viscous fluid-sealed damper 14, 39, 43, 46, 50, 53, or 71 of each of the first, twelfth, thirteenth, and fourteenth embodiments (including the modification examples thereof) is equipped with the sealing member 17, 44, or 49 and the lid member 18, 42, or 45, in a fifteenth modification example common to the above embodiments, a through-hole 22b extending in the thickness direction is formed in the flange portion 22 of the container main body 16, 40, 47, 51, or 54. Further, the sealing member 17, 44, or 49 is provided with columnar fixation protrusions 17e, 44f, or 49f directed toward the lid member 18, 42, or 45 so as to extend in the compressing direction of the flange portion 22. Further, the lid member 18, 42, or 45 is provided with columnar fixation protrusions 18*d* or 45*f* directed toward the sealing member 17, 44, or 49 so as to extend in the compressing direction of the flange portion 22. Further, each fixation protrusion 17*e*, 44*f*, 49*f*, 18*d*, or 45*f* is inserted into the through-hole 22*b* of the flange portion 22. In addition, the height dimension of each fixation protrusion 17*e*, 44*f*, 49*f*, 18*d*, or 45*f* is approximately half the depth dimension of the lock surface portion 17*a*, 44*a*, or 49*b* as measured in the thickness direction of the sealing member 17, 44, or 49, and the distal ends of the fixation protrusions 17*e*, 44*f*, or 49*f* of the sealing member 17, 44, or 49 and the distal ends of the fixation protrusions 18*d* or 45*f* of the lid member 18 or 45 are fixed to each other by ultrasonic fusion-bonding (see FIG. 20). In this construction, it is possible to perform positioning correctly on the sealing member 17, 44, or 49 and the lid member 18, 42, or 45 with respect to the flange portion 22. Since the fixation protrusions 17*e*, 44*f*, or 49*f* and the fixation protrusions 18*d* or 45*f* are fixed to each other within the through-hole 22*b* of the flange portion 22, it is possible to firmly assemble together the container main body 16, 40, 47, 51, or 54, the sealing member 17, 44, or 49, and the lid member 18, 42, or 45 through physical fit-engagement.

Sixteenth Modification Example Common to Above Embodiments

While in the viscous fluid-sealed damper 14, 39, 43, 46, 50, 53, or 71 of each of the first, twelfth, thirteenth, and fourteenth embodiments (including the modification examples thereof) the sealing member 17, 44, or 49 is provided with the fixation protrusions 17*e*, 44*f*, or 49*f*, and the lid member 18, 42, or 45 is provided with the fixation protrusions 18*d* or 45*f*, in a sixteenth modification example common to the above embodiments, one of the sealing member 17, 44, or 49 and the lid member 18, 42, or 45 is provided with fixation protrusions 17*e*, 44*f*, or 49*f* or fixation protrusions 18*d* or 45*f* having a height dimension equal to the depth dimension of the lock surface portion 17*a*, 44*a*, or 49*b* as measured in the thickness direction of the sealing member 17, 44, or 49 (see FIGS. 21A and 21B). In this construction, there is no need to perform positioning on the container main body 16, 40, 47, 51, or 54 with respect to the other of the sealing member 17, 44, or 49 and the lid member 18, 42, or 45 not provided with the fixation protrusions 17*e*, 44*f*, 49*f*, 18*d*, or 45*f*; and, as in the fifteenth embodiment, it is possible to physically fit-engage the container main body 16, 40, 47, 51, or 54, the sealing member 17, 44, or 49, and the lid member 18, 42, or 45 with each other, making it possible to firmly assemble these components together.

What is claimed is:

1. A viscous fluid-sealed damper, comprising:
   a sealing container including a container main body and a lid member closing an opening end of the container main body; and
   a viscous fluid sealed in the sealing container,
   the sealing container being fixed to a supporting body and to a supported body to damp vibration of the supported body by virtue of viscous resistance of the viscous fluid,
   wherein the container main body includes, at an opening end, a flange portion which outwardly protrudes,
   wherein the viscous fluid-sealed damper further comprises a sealing member including a lock surface portion to be locked to the flange portion and a fixation surface portion to be fixed to the lid member at an outer periphery of the container main body, the fixation surface portion and the lid member being fixed to each other to thereby hold the flange portion between the lock surface portion and the lid member in a compressed state, for sealing the opening end of the container main body in a liquid-tight fashion,
   wherein the flange portion is provided with a through-hole extending through a thickness of the flange portion, and
   wherein at least one of the sealing member and the lid member includes a fixation protrusion to be inserted into the through-hole, for fixing the sealing member and the lid member to each other.

2. A viscous fluid-sealed damper according to claim 1,
   wherein the sealing member and the lid member are formed of a hard resin material allowing ultrasonic fusion-bonding, and
   wherein the lid member includes a fixation surface portion to be fixed to a fixation surface portion of the sealing member through ultrasonic fusion-bonding.

3. A viscous fluid-sealed damper according to claim 1, wherein the lid member includes a protruding wall portion protruding to a side of an inner peripheral surface of the container main body at the opening end side.

4. A viscous fluid-sealed damper according to claim 1, wherein the sealing member includes an outer wall portion protruding to a side of an outer peripheral surface of the container main body at the opening end side.

5. A viscous fluid-sealed damper according to claim 3, wherein the protruding wall portion is provided so that the protruding wall portion is in contact with the inner peripheral surface of the container main body at the opening end side.

6. A viscous fluid-sealed damper according to claim 3, wherein the protruding wall portion is formed in an annular configuration, and includes a deairing gap portion.

7. A viscous fluid-sealed damper according to claim 5, wherein the protruding wall portion is formed in an annular configuration, and includes a deairing gap portion.

8. A viscous fluid-sealed damper, comprising:
   a sealing container including a container main body and a lid member closing an opening end of the container main body; and
   a viscous fluid sealed in the sealing container,
   the sealing container being fixed to a supporting body and to a supported body to damp vibration of the supported body by virtue of viscous resistance of the viscous fluid,
   wherein the container main body includes, at an opening end, a flange portion which outwardly protrudes,
   wherein the viscous fluid-sealed damper further comprises a sealing member including a lock surface portion to be locked to the flange portion and a fixation surface portion to be fixed to the lid member at an outer periphery of the container main body, the fixation surface portion and the lid member being fixed to each other to thereby hold the flange portion between the lock surface portion and the lid member in a compressed state, for sealing the opening end of the container main body in a liquid-tight fashion,
   wherein the lid member includes a protruding wall portion protruding to a side of an inner peripheral surface of the container main body at the opening end side, and
   wherein the protruding wall portion is formed in an annular configuration, and includes a deairing gap portion.

9. A viscous fluid-sealed damper according to claim 8, wherein at least one of the lock surface portion of the sealing member and the lid member holding the flange portion therebetween includes a pressing protrusion further compressing the flange portion.

10. A viscous fluid-sealed damper according to claim 8,
wherein at least one of the lock surface portion of the sealing member and the lid member holding the flange portion therebetween includes a protrusion, and
wherein the flange portion includes an engagement groove to be fit-engaged therewith.

11. A viscous fluid-sealed damper according to claim 8,
wherein at least one of the lock surface portion of the sealing member and the lid member holding the flange portion therebetween includes an engagement groove, and
wherein the flange portion includes a protrusion to be fit-engaged therewith.

12. A viscous fluid-sealed damper according to claim 8,
wherein the flange portion is provided with a through-hole extending through a thickness of the flange portion, and
wherein at least one of the sealing member and the lid member includes a fixation protrusion to be inserted into the through-hole, for fixing the sealing member and the lid member to each other.

13. A viscous fluid-sealed damper according to claim 8,
wherein the sealing member and the lid member are formed of a hard resin material allowing ultrasonic fusion-bonding, and
wherein the lid member includes a fixation surface portion to be fixed to a fixation surface portion of the sealing member through ultrasonic fusion-bonding.

* * * * *